United States Patent
Andrews et al.

(10) Patent No.: US 9,993,770 B2
(45) Date of Patent: Jun. 12, 2018

(54) PROCESS AND APPARATUS FOR CAPTURING GASEOUS AMMONIA

(71) Applicants: Dirk Andrews, Aptos, CA (US); Randol E. Kirk, Albuquerque, NM (US); Daniel F. Gorzen, Ypsilanti, MI (US)

(72) Inventors: Dirk Andrews, Aptos, CA (US); Randol E. Kirk, Albuquerque, NM (US); Daniel F. Gorzen, Ypsilanti, MI (US)

( * ) Notice: Subject to any disclaimer, the term of this patent is extended or adjusted under 35 U.S.C. 154(b) by 0 days. days.

(21) Appl. No.: 15/177,158

(22) Filed: Jun. 8, 2016

(65) Prior Publication Data

US 2017/0128880 A1 May 11, 2017

Related U.S. Application Data

(63) Continuation-in-part of application No. 14/076,529, filed on Nov. 11, 2013, now abandoned.

(51) Int. Cl.
*B01D 53/58* (2006.01)
*B01D 53/78* (2006.01)
(Continued)

(52) U.S. Cl.
CPC .......... *B01D 53/58* (2013.01); *A01K 1/0047* (2013.01); *B01D 53/78* (2013.01); *B01D 53/79* (2013.01);
(Continued)

(58) Field of Classification Search
CPC .. B01D 53/53; B01D 53/78; B01D 2251/508; B01D 53/79; B01D 2258/0266; C01C 1/242; A01K 1/0047; A01K 1/00
See application file for complete search history.

(56) References Cited

U.S. PATENT DOCUMENTS 374,618 A 12/1887 Nash
1,928,266 A * 9/1933 Rosenstein ............. C01C 1/242
423/545

(Continued)

FOREIGN PATENT DOCUMENTS

EP 3075241 A1 * 10/2016 ........... A01K 1/0047
NL 1004135 C2 * 3/1998 ........... A01K 1/0047

OTHER PUBLICATIONS

Cornell Waste Management Institute. Compost Fact Sheet #5: Compost Bulking Materials. 2004. Downloaded from Cornell Waste Management Institute website on Nov. 29, 2012: <http://cwmi.css.cornell.edu/compostfs5.pdf>.
(Continued)

*Primary Examiner* — Timothy C Vanoy
(74) *Attorney, Agent, or Firm* — Patrick Reilly

(57) ABSTRACT

A method and system for collecting gaseous nitrogen compounds into an aqueous solution are provided. The method enables the combination of gaseous sulfur and nitrogen compounds in the aqueous solution to generate ammonium compound components, to include ammonium sulfate. Sulfur may be pressure injected into the solution as gaseous sulfur dioxide. Optionally, carbon may be introduced into the solution as gaseous carbon dioxide. The sulfur may be earlier sourced by a burning of a sulfurous solid. The pH of the solution may be monitored and the introduction of ammonia, carbon and/or sulfur may be halted or constrained while the pH of the solution is measured outside of specified range. The solution may be allowed to age to permit a mix of compounds of ammonium carbonate, ammonium bicarbonate and ammonium carbamate to restabilize and thereby encourage a renewed surge of ammonium sulfate generation.

20 Claims, 24 Drawing Sheets

(51) Int. Cl.
B01D 53/79 (2006.01)
C01C 1/242 (2006.01)
A01K 1/00 (2006.01)
(52) U.S. Cl.
CPC ........ C01C 1/242 (2013.01); B01D 2251/508 (2013.01)

(56) References Cited

U.S. PATENT DOCUMENTS

| | | | |
|---|---|---|---|
| 3,357,812 A | 12/1967 | Snell | |
| 3,864,247 A | 2/1975 | Fuchs | |
| 3,984,226 A | 10/1976 | Garthus | |
| 4,292,328 A | 9/1981 | Coulthard et al. | |
| 5,093,262 A | 3/1992 | Kimura | |
| 5,616,163 A | 4/1997 | Halfter | |
| 5,624,649 A | 4/1997 | Gal | |
| 7,194,979 B2* | 3/2007 | Moore, Jr. | A01K 1/0047 119/448 |
| 7,887,615 B2 | 2/2011 | Spindler et al. | |
| 8,580,219 B2 | 11/2013 | Hickey | |
| 8,662,019 B2 | 3/2014 | Eutsler et al. | |
| 8,663,551 B1 | 3/2014 | Moore, Jr. | |
| 9,095,115 B1* | 8/2015 | Knueven | A01K 1/0047 |
| 9,155,282 B2 | 10/2015 | Eutsler et al. | |
| 9,364,787 B2* | 6/2016 | Zhao | B01D 53/58 |
| 9,822,024 B2 | 11/2017 | Meng et al. | |
| 2008/0289493 A1* | 11/2008 | Caro | A01K 1/0047 95/23 |
| 2009/0078013 A1 | 3/2009 | Spindler et al. | |
| 2016/0250589 A1* | 9/2016 | Zhao | B01D 53/58 |

OTHER PUBLICATIONS

Tiquia, S. M. et al. Microbial Activities During Composting of Spent Pig-Manure Sawdust Litter at Different Moisture Contents. Elsevier: Bioresource Technology, 1996. pp. 201-206.
Hotta Set al. Biodegradability of Fecal Nitrogen in Composting Process. Elsevier: Bioresource Technology, 2007. vol. (98). pp. 3412-3414.
"Air Emissions of Ammonia and Methane from Livestock Operations", Shih et al., Resources for the Future, Mar. 2006, RFF DP 06-11, p. 1-28.
"Qualitative Characterization of Volatile Compound Emissions during Biological Decomposition of Plant Materials using SPME-GC-MS", Akdeniz et al., Iowa State University, Dept. of Agricultural & Biosystems Engineering, Paper No. 374041, Written for presentation at the 2007 ASABE Annual Internationa I Meeting , p. 1-12.
"Odor Mitigation for Concentrated Animal Feeding Operations: White Paper and Recommendations", Dept. of Agricultural & Biosystems Engineering, Published in 913C0306 Pub. Date Mar. 2006, p. 1-58.
"Microbial Community Structure Dynamics During Aerated and Mixed Composting", VanderGheynst et al., American Society of Agricultural Engineers, vol. 46(2): 577-584, Jan. 2003, p. 1-18.
"Carbon Turnover and Ammonia Emissions during Composting of Biowaste at Different Temperatures", Eklind et al., Copyright © 2007 by the American Society of Agronomy, Crop Science Society of America, and Soil Science Society of America, Journal of Environmental Quality, vol. 36, p. 1512-1520.
California Department of Food and Agriculture (CDFA) Fertilizer Inspection Advisory Board Meeting, Meeting Minutes, Asif A. Maan, Ph.D., Branch Chief Feed, Fertilizer, and Livestock Drugs Regulatory Services Inspection Services, Jan. 19, 2007, p. 1-5.
"Dynamics of Biological Systems, Chapter 3: Microbial Systems", Cundiff et al., Copyright © 2003 by the American Society of Agricultural Engineers, p. 1-49.
"Managing Manure to Improve Air and Water Quality", Aillery et al., United States Dept. of Agriculture (USDA) Economic Research Report, Sep. 2005; www.ers.usda.gov; p. 1-65.
"Sustainable Treatment Method of a High Concentrated NH3 Wastewater by Using Natural Zeolite in Closed-Loop Fixed Bed Systems", © Zorpas et al.; Licensee Bentham Open, Open Environmental Sciences, 2010, vol. 4, p. 1-7.
"Reducing Ammonia Emissions from Poultry Litter", Philip Moore, USDA-ARS, Poultry Production and Product Safety Research Unit, USDA Agricultural Air Quality Task Force Meeting, Mar. 9, 2010, p. 1-75.
International Search Report and Written Opinion, International Application No. PCT/US2012/46087, dated Sep. 24, 2012, p. 1-16.
Hickman et al., "Using Ammonium Sulfate Fertilizer As an Organic Mulch Fire Retardant", Journal of Arboriculture 22(6): 279—Nov. 1996, p. 279-280.
"Removal and Recovery of Ammonia from Liquid Swine Manure and Poultry Litter Using Gas Permeable Membranes", Vanotti et al., United States Department of Agriculture (USDA), Agricultural Research Service (ARS), Coastal Plains Research Center, 2004, p. 1-4.
"On-Farm Composting of Poultry Litter", Forbes Walker, Agricultural Extension Service, The University of Tennessee, 2018, p. 1-9.
Inorganic Chemical Industry, Section 8.4, Oct. 1996, p. 1-4.
Aillery, Marcel P. & Gollehon, Noel R. & Johansson, Robert C. & Kaplan, Jonathan D. & Key, Nigel D. & Ribaudo, Marc, 2005. "Managing Manure to Improve Air and Water Quality," Economic Research Report 33593, United States Department of Agriculture, Economic Research Service.
A. Cotta, Michael & R. Whitehead, Terence & L. Zeltwanger, Rhonda. (2003). Isolation, characterization and comparison of bacteria from swine faeces and manure storage pits. Environmental Microbiology. 5.. 10.1046/i.1467-2920.2003.00467.x.
Jun Zhu, A review of microbiology in swine manure odor control, Agriculture, Ecosystems & Environment, vol. 78, Issue 2, Apr. 2000, pp. 93-106, ISSN 0167-8809, https://doi.org/10.1016/S0167-8809(99)00116-4.
National Lime Association (NLA). Animal Wastes. Downlaoded on Aug. 19, 2013 from the NLA website: http://www.lime.org/uses_of_lime/enviromental/animal_wastes.asp>.
Vanotti, M.B., Garcia Gonzalez, M. 2014. Removal and recovery of ammonia from livestock wastewater using hydrophobic gas-permeable membranes. American Chemical Society Abstracts. 370. Available: http://abstracts.acs.org//chem/248nm/program/divisionindex.php?nl=1&act=presentations&val=Novel+Membranes+and+Membrane+Processes+for+Desalination+and+Water+Treatment&ses=Novel+Membranes+and+Membrane+Processes+for+Desalination+and+Water+Treatment&prog=234261.

* cited by examiner

PROCESS AND APPARATUS FOR CAPTURING GASEOUS AMMONIA

CO-PENDING PATENT APPLICATION

This Nonprovisional Patent Application is a Continuation-in-Part Application to Nonprovisional patent application Ser. No. 14/076,529 filed on Nov. 11, 2013 and titled "PROCESS AND APPARATUS FOR CAPTURING GASEOUS AMMONIA". Nonprovisional patent application Ser. No. 14/076,529 is hereby incorporated by reference in its entirety and for all purposes, to include claiming benefit of the priority date of filing of Nonprovisional patent application Ser. No. 14/076,529.

FIELD OF THE INVENTION

The present invention generally relates to the remediation of areas and materials that are present undesirable levels of nitrogen compounds, ammonia and/or ammonium compounds. More particularly, the present invention is directed to capturing gaseous ammonia in an aqueous solution by precipitation and conversion into a non-volatile ammoniacal salts.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Various natural processes, agricultural activities and sewage treatment operations generate outputs that include nitrogen compounds, ammonium compounds and ammonia, wherein the ammonia is generated in a gaseous state and/or out-gasses at ambient temperatures. Factory farming of livestock, offered as one example of a relevant industrialized agricultural activity that often generates excessive levels of nitrogen compounds and ammonia gas, is increasingly drawing attention as a source of nitrogen compounds pollution of soil, water and air. It is noted that both mammalian dung and avian feces contain nitrogen compounds that can contribute to pollution of the natural environment. Sewage treatment plants are also generally tasked with reducing or eliminating human contribution to nitrogen compounds pollution of the environment. In an additional area relevant to certain applications of the present invention, sites of drug and chemical manufacture can be contaminated by ammonia gas and other compounds containing nitrogen.

The prior art provides methods of capturing ammonia by generating concentrated sulfuric acid solutions and transporting the concentrated acidic solution to a site where a target gaseous ammonia is located. The concentrated sulfuric acidic solution sulfuric is then mixed with a water volume to create an acid bath that is exposed to the target ammonia. This prior art method includes several short comings, not the least of which are the costs of handling and transportation and the risk of metal contamination of the concentrated sulfuric acid solution during storage and transit.

Yet the prior art fails to provide optimal methods and systems that enable the extraction of nitrogen from gaseous ammonia and ammonium compounds present in outputs of many widely practiced industrial and agricultural systems.

There is therefore a long-felt need to provide a method and apparatus that enable the collection of nitrogen compounds from laboratory facilities, industrial sites and agricultural operations.

OBJECTS OF THE INVENTION

It is an object of the method of the present invention (hereinafter, "the invented method") to remove gaseous ammonia from a site atmosphere by introducing sulfur dioxide as a solute to acidify an aqueous solution, wherein the sulfur dioxide is generated by burning sulfur on-site, and whereby the resultant acidic aqueous solution absorbs the gaseous ammonia and generates resultant chemical compounds that capture nitrogen from nitrogen compounds.

It is an optional object of the invented to generate ammonium sulfate as a resultant compound of interaction sponsored within the acidic aqueous solution as a result of absorption of ammonia by the aqueous solution, and optionally absorbing carbon dioxide, from the site atmosphere.

It is an additional optional object of the invented method to absorb ammonia and optionally absorbing carbon dioxide in the acidic aqueous solution, wherein the ammonia and the carbon dioxide is generated by bacterial processing of organic waste matter.

It is a still additional optional object of the invented to generate ammonium sulfate as a resultant chemical compound of interaction of the acidic aqueous solution with ammonia, wherein the ammonia is generated by bacterial processing of organic waste matter.

SUMMARY

Toward these and other objects that are made obvious in light of the present disclosure, an, organic ammonium sulfate product is produced by aerobically composting a source of nitrogen, such as animal waste or manure mixed with a carbon source to create a biomass having a high solids content, through highly selective aerobic bacteria action without addition of external heat. Preferably, the production process includes the steps of providing a composting apparatus located inside a composting building such as a barn, a shed, or a greenhouse, housing a composting trench; placing the animal waste or manure preferably collected from a CAFOs facility in said composting trench; mixing said animal waste or manure with a source of carbon to form a biomass having a high solids content; providing aerobic bacteria and supplying said aerobic bacteria with water and oxygen in sufficient amounts to highly selectively convert the waste amino acids, proteins, uric acid and any other available nitrogen compounds from the biomass into $NH_3$ and/or $NH_4$ and $CO_2$ without addition of external heat; moving said biomass down the composting trench as the aerobic composting process progresses; capturing the $NH_3$ and/or $NH_4$ and $CO_2$ from the atmosphere of the composting apparatus in an aqueous solution; adding a source of sulfate to said aqueous solution containing captured $NH_3$ and/or $NH_4$ and $CO_2$, and processing said aqueous solution containing a source of sulfate and captured $NH_3$ and/or $NH_4$ and $CO_2$ to obtain ammonium polycarbonate and/or solid or concentrated liquid ammonium sulfate product. Preferably, the obtained ammonium sulfate product is certifiable as organic.

Certain alternate preferred embodiments of invented method and an invented apparatus enable the extraction of nitrogen from gaseous ammonia by the application of sulfur dioxide generated by burning sulfur. In an optional aspect of the invented method, gaseous ammonia is introduced into an acidic aqueous solution and ammonium sulfate is produced from the resulting aqueous solution. Sulfur and/or sulfur dioxide may be introduced into the aqueous solution to further acidify the aqueous solution and sponsor the production of ammonium sulfate. Optionally of additionally, carbon and/or carbon dioxide may be introduced into the aqueous solution to further sponsor the production of ammonium sulfate.

In a first application of the invented method, a volume of source air that comprises gaseous ammonia is introduced into an aqueous solution containing sulfur dioxide. The source air containing the ammonia gas may optionally simply be introduced into the water volume without filtering out of any constituents and/or without any significant or intended chemical processing.

In another optional aspect of the invented method, the internal atmosphere of an enclosed structure containing ammonia gas and optionally carbon dioxide is at least partially scrubbed of the ammonia gas by exposing the enclosed internal atmosphere to an acidic aqueous solution. The aqueous solution preferably comprises sulfur dioxide generated by burning sulfur in the presence of oxygen. The acidified aqueous solution having received the sulfur dioxide then is exposed to gaseous ammonia to sponsor the production of chemical compounds within the aqueous solution whereby gaseous ammonia and nitrogen compounds are removed from the internal atmosphere. Ammonium sulfate may be produced as a resultant compound in certain alternate preferred embodiments of the invented method.

In another optional aspect of the invented method, an enclosure is established at a site contaminated with a solid or liquid source material, wherein the source material contains ammonium compounds and emits gaseous ammonia. The enclosure may be a portable structure that is temporarily erected as the instant site and may be successively redeployed at alternate locations. Emission of ammonia gas may be facilitated or accelerated by aerating the source material, e.g., mechanically tilling solid source material, or churning a liquid source material with ambient air containing oxygen. A resultant acceleration of gaseous ammonia production by disturbance and/or introduction of oxygen into the source material may be effected by the organic function of bacteria present or seeded within the source material.

In yet another optional aspect of the invented method, the pH of the aqueous solution may be monitored and the introduction of ammonia, sulfur dioxide and/or carbon dioxide may be halted while the pH is measured outside of a prespecified range, e.g., a range of preferably from approximately 4.0 to 5.0, or alternately a range of from 3.0 to 6.0.

In a still additional optional aspect of the invented method, ammonium sulfate is filtered out and/or extracted from the aqueous solution and optionally provided for or used as an agricultural fertilizer. The ammonium sulfate may be removed from the aqueous solution as a concentrated solution or in combination with a portion of the aqueous solution.

In an even other optional aspect of the invented method, gaseous sulfur dioxide is pressure injected and/or infused into the aqueous solution to sponsor formation of solid ammonium sulfate, other precipitates, and/or chemical components.

In another optional aspect of the invented method, components are removed from the aqueous solution and the resultant water is reused in a following cycle of scrubbing gaseous ammonia from an enclosed atmosphere and/or ammonium sulfate generation.

In a still other optional aspect of the invented method, the aqueous solution may be allowed to age to permit a mix of compounds within the aqueous solution, including but not limited to ammonium carbonate, ammonium bicarbonate and ammonium carbomate, to rebalance and thereby sponsor a renewed surge of ammonium sulfate generation.

This Summary and Objects of the Invention is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

These, and further features of the invention, may be better understood with reference to the accompanying specification and drawings depicting the preferred embodiment, in which.

DETAILED DESCRIPTION OF THE INVENTION

It is to be understood that this invention is not limited to particular aspects of the present invention described, as such may, of course, vary. It is also to be understood that the terminology used herein is for the purpose of describing particular aspects only, and is not intended to be limiting, since the scope of the present invention will be limited only by the appended claims.

Methods recited herein may be carried out in any order of the recited events which is logically possible, as well as the recited order of events.

Where a range of values is provided herein, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the methods and materials are now described.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

It will be appreciated that terms such as "front," "back," "top," "bottom," "left," "right," "horizontally," "up," "down," and "side" used herein are merely for ease of description and refer to the orientation of the components as shown in the figures. It is to be understood that any orientation of the apparatus, and the components thereof described herein, is within the scope of the present invention.

In a preferred embodiment, the term "organic" as used herein is a labeling certification term that refers to an agriculture product produced in accordance with the Code of Federal Regulations ("CFR") Title 7 (Subtitle B, Chapter I, Subchapter M, Part 205). As used hereinafter, "organic ammonium sulfate" is interchangeable with "ammonium sulfate," "organic ammonium sulfate product," and/or "product." As used herein, "plurality" means "one or more."

Figure 1A:
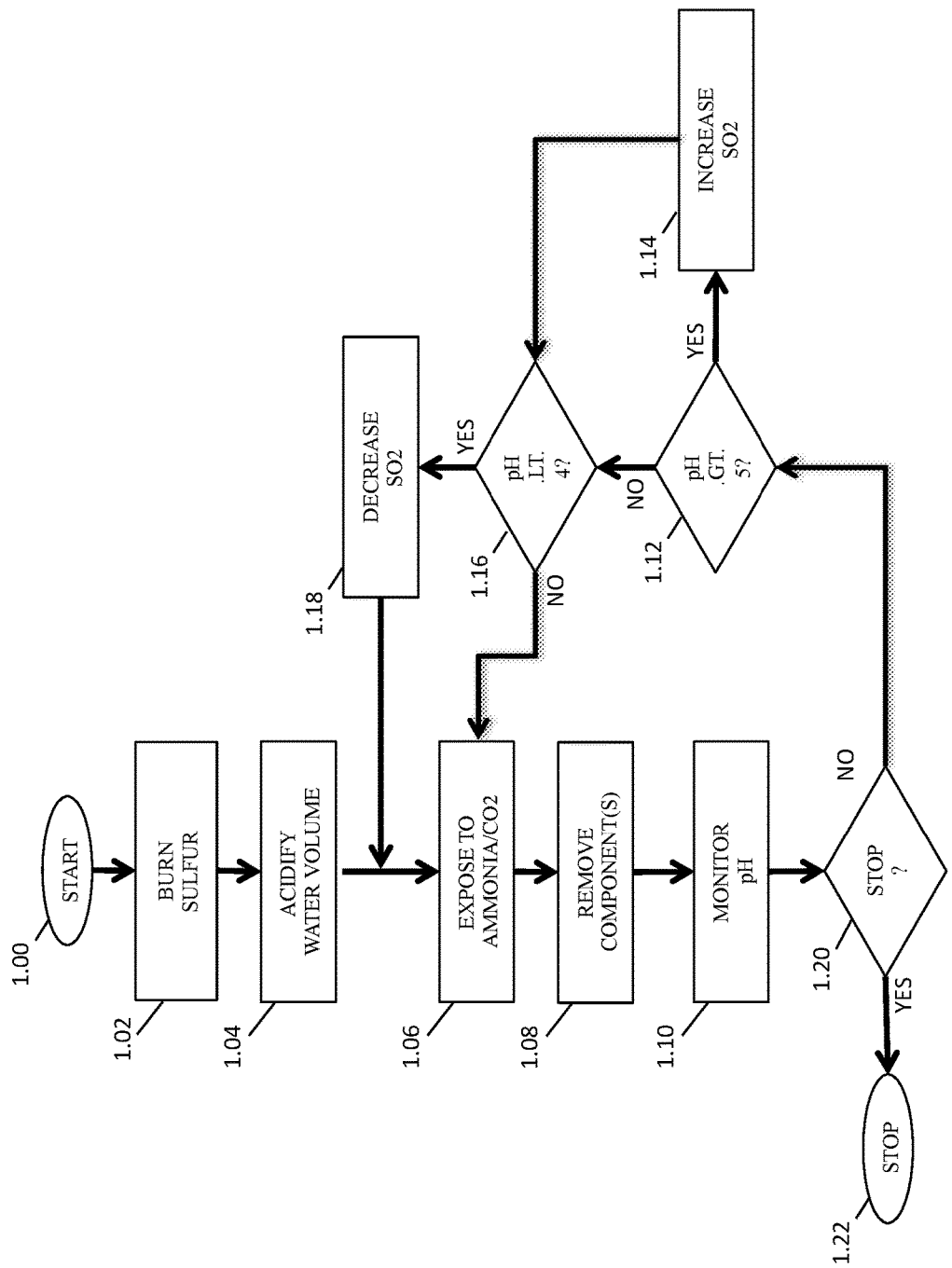
FIG. 1A is a process chart comprising aspects of the invented method.
Figure 1B:
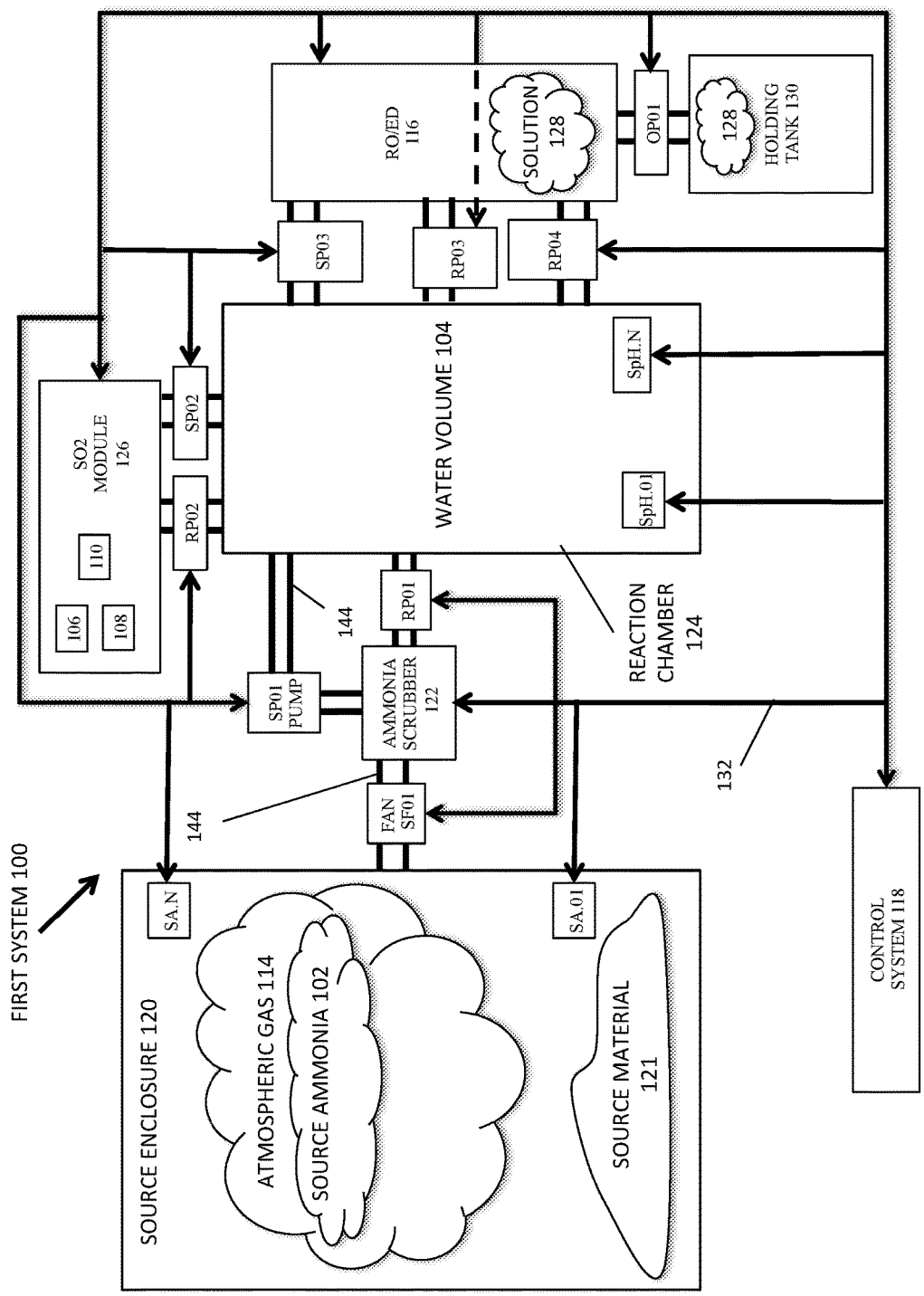
FIG. 1B is a block diagram of a first preferred embodiment of the invented apparatus (hereinafter, "first system") coupled with a gaseous ammonia source, the first system comprising a reaction chamber holding a water volume, an ammonia gas scrubber module coupled with the reaction chamber and the gaseous ammonia source, a sulfur dioxide module coupled with the reaction chamber and providing sulfur dioxide to the water volume, and a combined reverse osmosis module and electro dialysis coupled with the reaction chamber.
Figure 1C:
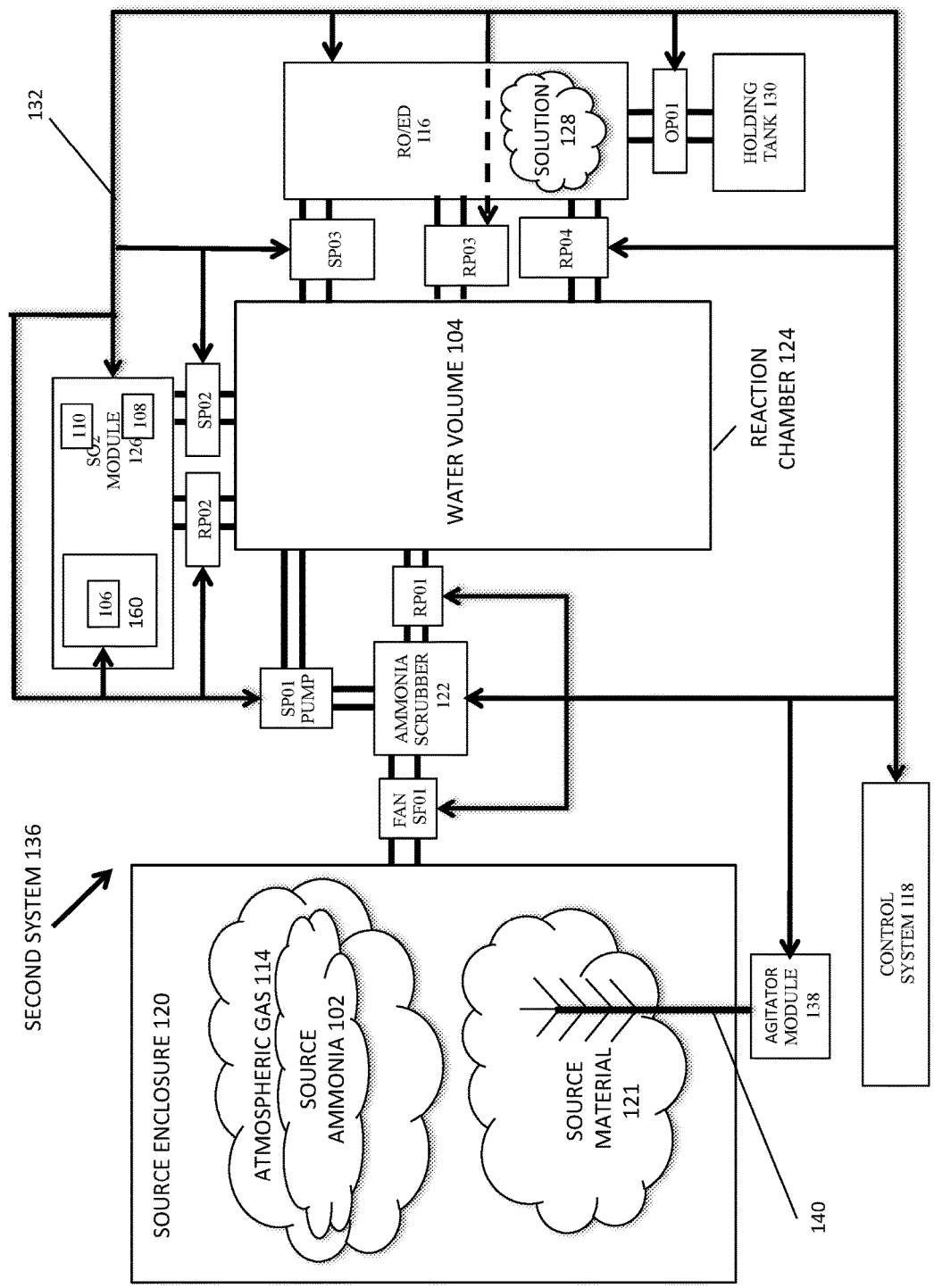
FIG. 1C is a block diagram of a second preferred embodiment of the invented apparatus (hereinafter, "second system") coupled with a gaseous ammonia source, the second system comprising the first system and an agitator module coupled with a source material, the agitator module adapted to encourage production of gaseous ammonia by the gaseous ammonia source.

Referring now generally to the Figures and particularly to FIGS. 1A, 1B and 1C, FIG. 1A is a process chart comprising aspects of the invented method that may be instantiated by the first preferred embodiment 100 of the present invention (hereinafter, "the first system 100"). In step 1.00 the first system 100 is preferably co-located with a volume of source ammonia gas 102. In step 1.02 and proximate to a water volume 104, a sulfur mass 106 in a solid form is burned in the presence of atmospheric oxygen 108 to form gaseous sulfur dioxide 110. The temperature of the source ammonia gas 102 and the water volume 104 is initially preferably within 5 degrees Celsius of the ambient temperature of the site environment of the first system 100 and also preferably within the temperatures range of greater than the freezing point of the water volume 104 and less than the boiling point of the water volume 104.

The water volume 104 is then acidified in step 1.04 by introduction of the sulfur dioxide 110 to form an acidic aqueous solution 112, as indicated in FIG. 1C.

The acidic aqueous solution 112 is then exposed to the source ammonia gas 102, and optionally carbon dioxide, in step 1.06, wherein portions of the source ammonia gas 102, and optionally gaseous carbon dioxide, is absorbed by the aqueous solution 112 in step 1.06. It is understood that the source ammonia gas 102 may be comprised within an enclosed atmospheric gas 114 that includes other atomic and molecular components, such as carbon dioxide, and that the acidic aqueous solution 112 may absorb carbon dioxide and additional molecules and free atoms from the enclosed atmospheric gas 114 in step 1.06. It is further understood that the enclosed atmospheric gas 114 may be formed by adding ammonia, carbon dioxide and other products of bacteria acting on organic waste, e.g., dung or feces, to a pre-existing ambient atmosphere.

Precipitates, other solutes and/or certain non-aqueous components of the aqueous solution 112, e.g., ammonium sulfate, are concentrated and collected by circulation through a collection module 116 in step 1.08 to form an output solution 128 that is held in a holding tank 130 for removal from the first system 100, and the pH of the aqueous solution 112 is monitored in step 1.10. When a pH measurement of greater than 5.0 is determined in step 1.12, the rate of volumetric exposure of the gaseous sulfur dioxide 110 is increased in step 1.14, and when a pH measurement of lower than 4.0 is determined in step 1.16, the rate of volumetric exposure of the gaseous sulfur dioxide 111 is decreased in step 1.80

It is understood that the aqueous solution 112 is preferably substantively and continuously exposed to gaseous sulfur dioxide 110 in steps 1.06 through 1.18 albeit possibly at varying rates of volumetric exposure to the sulfur dioxide gas 110 is increased in step 1.14. It is further understood that the absorption of the source ammonia gas 102 indicated in step 1.06 and the collection of solutes and non-aqueous components of the aqueous solution of step 1.08 are preferably continuously and contemporaneously occurring during the instantiation of the loop of steps 1.06-1.18.

An operator or an automated control system 118 may act and/or elect to stop the process loop of steps 1.02 through 1.18 in step 1.20 whereby the burning of the sulfur mass 106 and the processes of steps 1.04 through 1.18 are halted are minimized.

Referring now generally to the Figures and particularly to FIG. 1B, FIG. 1B is a block diagram of the first system 100 that includes certain optional elements. The first system 100 is coupled to a source enclosure 120 that contains the source ammonia gas 102 and the enclosed atmospheric gas 114. The source ammonia gas 102 may be emitted from a source material 121 containing ammonium and/or ammonium compounds, and the first system 100 is adapted to withdraw the source ammonia gas 102, by itself and/or mixed within the enclosed atmospheric gas 114 located within the source enclosure 120, into an ammonia scrubber module 122 through which the water volume 104 is circulated. The water volume 104 is maintained within a reaction chamber 124 and the ammonia scrubber module 122 (hereinafter, "the ammonia scrubber module 122") is coupled to both the source enclosure 120 and the reaction chamber 124 and is further adapted to circulate the aqueous solution 112 to absorb the source ammonia gas 102. The source ammonia gas 102 is thus removed from the source enclosure 120 and inserted into the water volume 104 as the water volume 104 is circulated through the ammonia scrubber 122. A sulfur dioxide generation module 126 is also coupled with the reaction chamber 124 and is adapted to insert or infuse the gaseous sulfur dioxide 110 into the water volume 104 to form the aqueous solution 112 as the water volume 104 is circulated through the sulfur dioxide generation module 126.

The collection module 116 is a combined reverse osmosis module and electro dialysis module 116 (hereinafter, "the RO/ED module 116") and is additionally coupled with the reaction chamber 124 by tuning 144 to withdraw aqueous solution 112 and preferably return water volume 104. The RO/ED module 116 is adapted to remove certain chemicals, e.g., ammonium sulfate, from the aqueous solution 112 as the aqueous solution 112 is circulated through the RO/ED module 116. A concentrate output holding tank 126 is coupled with the RO/ED module 116 and is adapted to receive a concentrated output solution 128 formed within the RO/ED module 116 and containing both (a.) a portion of the water volume 104 as a solvent and (b.) a solute or component of at least one type of resultant chemical, e.g., ammonium sulfate, formed within the aqueous solution 112 by the invented method. The aqueous solution 112 and the concentrated output solution 128 may thus include ammonium sulfate as a solute or component, whereby ammonium sulfate is produced in a manner that is in conformance one or more governmental, regulatory or organizational standards and the resultant ammonium sulfate may receive a certification of a preferred or particular origin, such as a being certified, graded, trademarked or marked as a special type of organic sulfate. It is understood that the receipt of such certifications or authorizations may increase the market value and perceived quality of the resultant ammonium sulfate of the concentrated output solution 128.

It is also understood that the first system 100 may include commercially available equipment or their equivalents, wherein the ammonia scrubber 122 may be or comprise, or be comprised within, a wet flue gas scrubber marketed by Deryck A Gibson Ltd. of Kingston Jamaica. In various alternate preferred embodiments of the present invention, the acidified aqueous solution 112 may presented to the source ammonia gas 102 within the ammonia scrubber 122 as a mist, a spray or a waterfall as the aqueous solution 112 is circulated through the ammonia scrubber 122. The reaction chamber 124 may comprise sheets, walls, a bottom wall and or/ceiling wall of polyvinyl chloride or other suitable material known in the art.

The sulfur dioxide module 126 may be or comprise, or be comprised within, a sulfur dioxide burner system as marketed by Harmon Systems International, LLC of Bakersfield, Calif., whereby the sulfur dioxide gas 110 may be generated and commingled with water volume 104 that is circulated through the sulfur dioxide module 126. It is understood that the Harmon sulfur dioxide burner system oxidizes sulfur 106 into sulfur dioxide gas 110 by burning the elemental sulfur 106 with a propane torch in the presence of a pressurized circulating portion of the water volume 104 and air containing oxygen 108. The sulfur dioxide gas 110 is combined with the water volume 104 to produce sulfurous acid, or $H2SO3$, within the aqueous solution 112

In addition, the RO/ED module 116 may be or comprise, or be comprised within, a reverse osmosis/electro dialysis system as marketed by Ameridia Corporation of Moerdjik, Netherlands.

A control module 200 of the first system 100 generates and communicates commands to direct the activity, and provides electrical power that enables the functioning, of the first system 100 in the removal gaseous ammonia and the generation of resultant chemical compounds and precipitates e.g., ammonium sulfate. A communications and power bus 132 of the control module 118 enables the control module 118 to send and receive commands and data within the first system 100 and selectively and controllably provide power to other modules 116 122, 126, supply fans SF01, supply pumps SP01-SP04, motorized fluid return pumps R01-R03, and an output pump OP01.

Referring now generally to the Figures and particularly to FIG. 1C, FIG. 1C is a block diagram of a second preferred embodiment of the invented system 136 (hereinafter, "the second system 136") that includes the first system 100 and an agitator module 138 having an effector 140. The effector 140 is positioned relative to the source material 121 and is adapted to agitate the source material 121 in order to sponsor bacterial activity that accelerates a production of the source ammonia gas 102 for capture within the enclosure. The agitator module 140 may be or comprise (a.) a motorized rototiller, wherein the effector 140 is or comprises a mechanical arm or rake that is motor driven to mechanically disturb and aerate the source material 121; (b.) a pressurized air pump, wherein the effector 140 is or comprises a gas hose that delivers pressurized ambient air into the source material 121 and thereby disturbs and aerates the source material 121 with the pressurized ambient air.

Figure 1D:
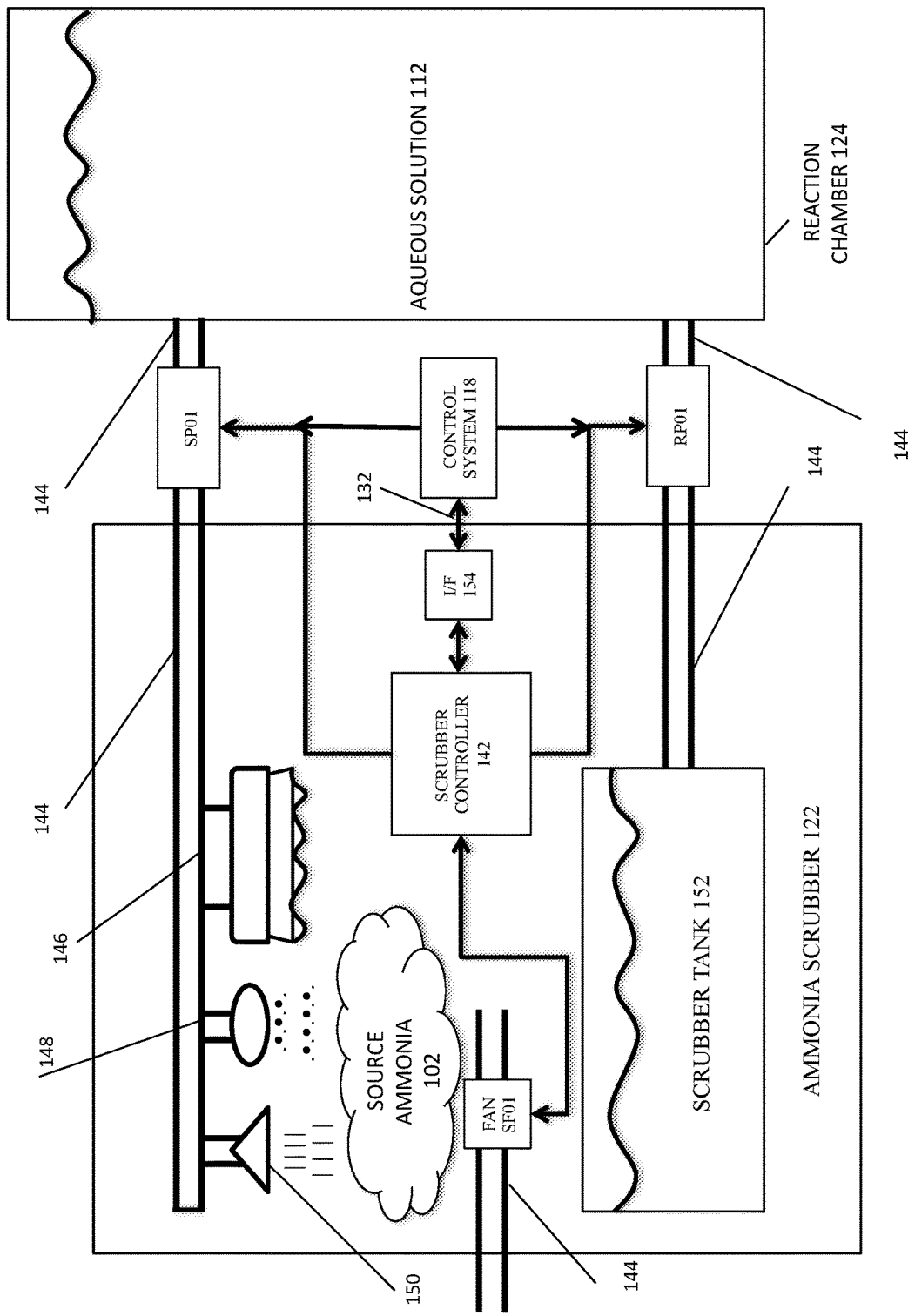
FIG. 1D is a block diagram a first preferred embodiment of the of the ammonia gas scrubber module of FIG. 1B.

Referring now generally to the Figures and particularly to FIG. 1D, FIG. 1D is a detailed block diagram of a first preferred embodiment of the ammonia scrubber 122. A first fluid supply pump SP01 as energized by a scrubber system control module 142 and/or the control system 118 pumps portions of the aqueous solution 112 from the reaction chamber 124 through substantively chemically inert tubing 144 through one or more aeration fixtures 146-150 to enable the aqueous solution 112 to absorb the source ammonia 102. The ammonia scrubber 122 further comprises a scrubber interface 154 that is bidirectionally communicatively coupled with the control module 118 via the communications and power bus 132. The scrubber interface 154 is additionally bi-directionally communicatively coupled with, or comprised within, the scrubber system control module 142.

The aqueous solution 112 passes through the source ammonia gas 112 and falls by gravity into a scrubber tank 152. A first aeration fixture 146 releases the aqueous solution 112 within the ammonia scrubber 122 as a sheet of fluid. A second aeration fixture 148 is a showerhead that releases the aqueous solution 112 into the source ammonia gas 102 as a fine water mist. A third aeration fixture 150 is a showerhead that releases the aqueous solution 112 into the source ammonia gas 102 as water droplets.

A first motorized fluid return pump SP01 as energized by the scrubber system control module 142 and/or the control system 118 pumps the aqueous solution 112 captured by the scrubber tank 152 through additional tubing 144 and thereby returns the aqueous solution 112 to the reaction chamber 124. An optional first supply fan SF01 as energized by the scrubber system control module 142 and/or the control system 118 propels or drives the source ammonia gas 102 and the enclosed atmospheric gas 114 from the enclosure 120 and into the ammonia scrubber 122 through a length of tubing 144. The scrubber tank 152 may comprise sheets, walls, a bottom wall and/or ceiling wall of polyvinyl chloride or other suitable material known in the art.

It is understood that the ammonia scrubber 122 may be or comprise a suitable and commercially available gas scrubber known in the art, and that the source fan SF01, the first motorized fluid supply pump SP01 and/or the first motorized fluid return pump RP01 may be comprised within the ammonia scrubber 122. It is further understood that the tubing 144 may be or comprise polyvinyl chloride piping or other suitable and preferably substantively chemically inert material known in the art.

Figure 1E:
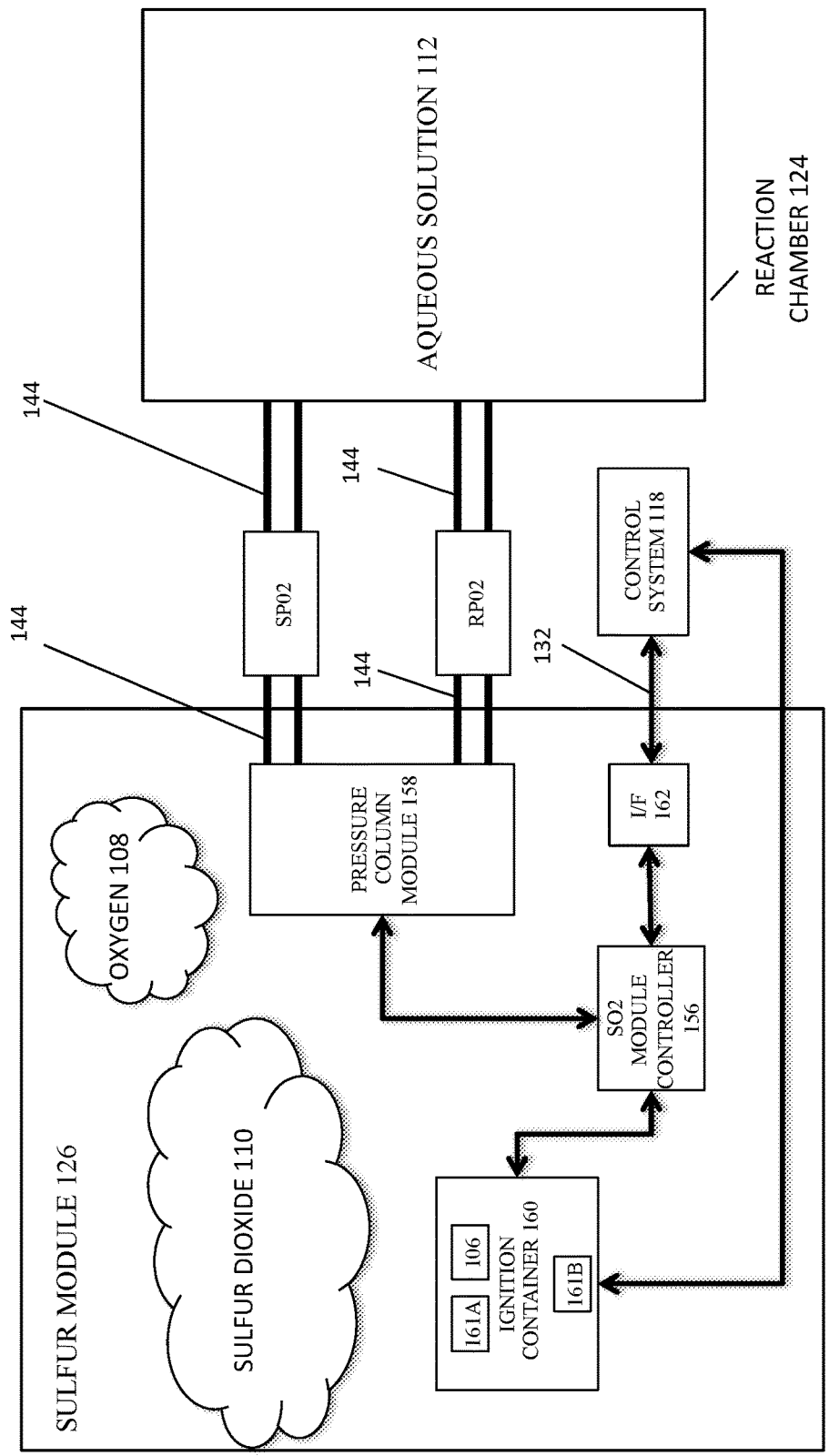
FIG. 1E is a block diagram of a first preferred embodiment of the sulfur dioxide module of FIG. 1B.

Referring now generally to the Figures and particularly to FIG. 1E, FIG. 1E is a detailed block diagram of a first preferred embodiment of the sulfur dioxide module 126. A second motorized fluid supply pump SP02 as energized by an SO2 module control module 156, and/or the control system 118, and thereupon pumps and circulates portions of the aqueous solution 112 from the reaction chamber 124 through substantively chemically inert tubing 144 through a pressure column module 158. The pressure column module 158 creates a pressure differential that infuses and/or introduces sulfur dioxide gas 110 into the water volume 104 to form and acidify the aqueous solution 112. An ignition chamber 160 is adapted to maintain the sulfur 106 within the sulfur module 126 before and during of the ignition of the sulfur 106. The ignition of the sulfur 106 may be accomplished by a user manually applying a flame 161 to the sulfur 106 or by an electronically controlled ignition device 161B that (a.) issues a flame or an igniting spark to the sulfur 106 when energized, or (b.) receives an ignition command message from the SO2 module controller 156 and/or the control system 118 and is thereby directed to generate a spark, a blue flame and/or another sulfur ignition medium known in the art. Still alternatively, optionally or additionally, the sulfur 106 may be or comprise touch-to-burn sulfur and may be manually ignited.

An SO2 module interface 162 is disposed between, and bi-directionally communicatively coupled with both of, the control system 118 and the SO2 module controller 156. Bi-directional communications between the control module 200 and the SO2 module controller 156 are enabled by the communications and power bus 132 and the SO2 module interface 162, whereby commands and data may be communicated to and from the control module 200 and the SO2 module controller 156. Electrical power is also provided to the sulfur dioxide module 126 via the communications and power bus 132 and the SO2 module interface 162.

Optionally and alternatively electrical power and/or commands are provided electronically controlled ignition device 161B by a communicative coupling of the electronically controlled ignition device 161B with the SO2 module controller 156 and/or the power and communications bus 132 of the control system 118.

It is understood that the sulfur module 126 may be or comprise a sulfur burner as marketed by Harmon Systems International, LLC of Bakersfield, Calif., or other suitable sulfur burner known in the art. It is further understood that the sulfur burner 126 may be or comprise a suitable and commercially available sulfur burner known in the art, and that the second motorized fluid supply pump SP02 and/or the second motorized fluid return pump RP02 may be comprised within the sulfur burner 126.

Figure 1F:
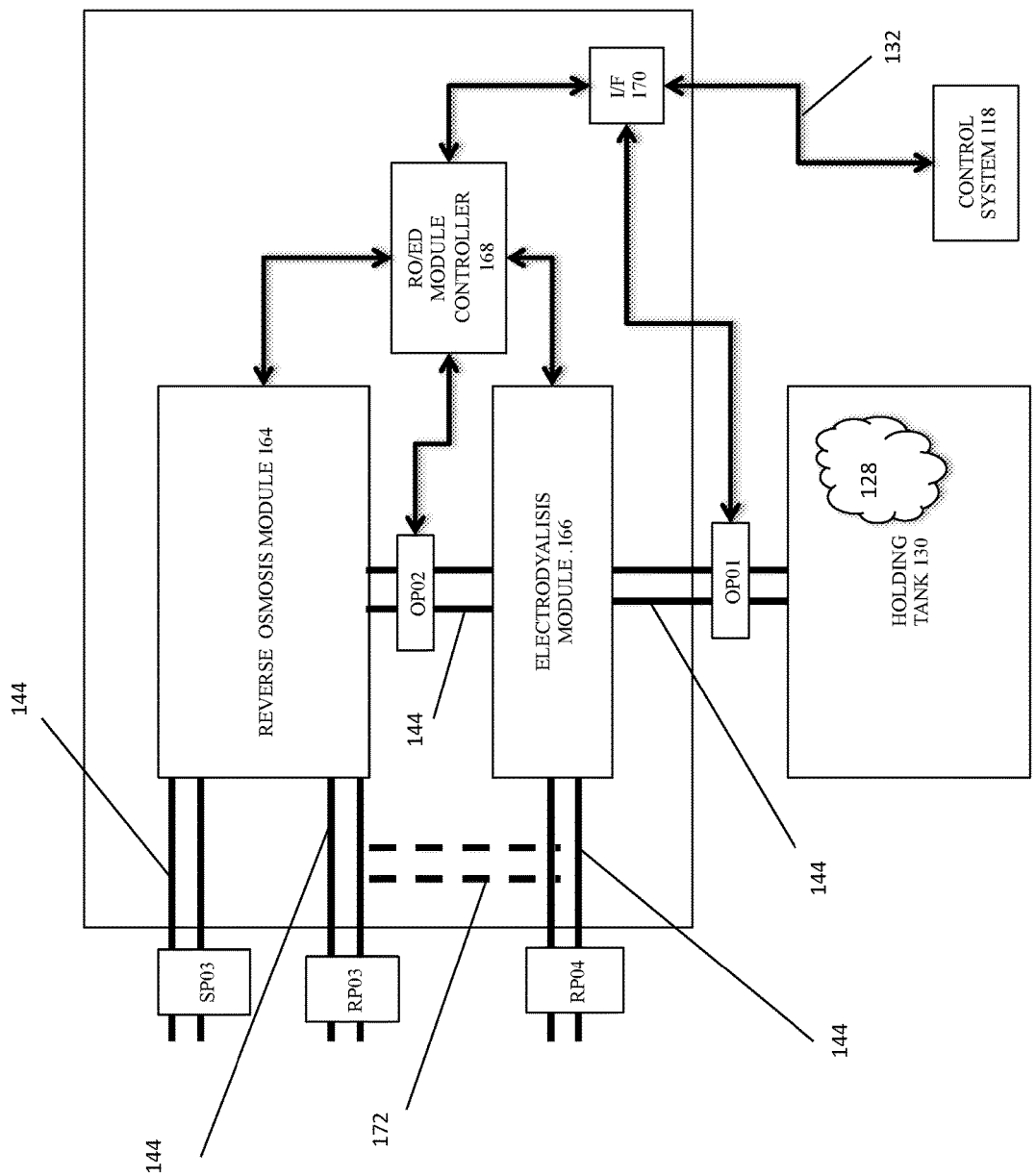
FIG. 1F is a block diagram a first preferred embodiment of the combined reverse osmosis module and electro dialysis of FIG. 1B.

FIG. 1F is a block diagram of a first preferred embodiment of the RO/ED module 116. The RO/ED module 116 may include a reverse osmosis module 164, an electrodialysis module 166, a reverse osmosis electro dialysis electronic logic controller module 168 (hereinafter, "RO/ED controller 168"), an electronic interface 170 to the reverse osmosis electro dialysis electronic logic controller module (hereinafter, "RO/ED interface 170") and a second motorized fluid output pump OP02. It is understood that one or more of the third motorized fluid supply pump SP03, the third motorized fluid return pump RP03, the fourth motorized fluid return pump RP04, the first motorized fluid output pump OP01, and the output holding tank 130 may be optionally or additionally comprised within the RO/ED module 116. Bi-directional communications between the control module 200 and the RO/ED controller 168 is enabled by the communications and power bus 132 and the RO/ED interface 170, whereby commands and data may be communicated to and from the control module 200 and to the RO/ED controller 168. Electrical power is also provided to the RO/ED module 116 via the communications and power bus 132 and the RO/ED interface 170.

The RO/ED controller 168 is optionally bidirectionally communicatively coupled to the reverse osmosis module 164 and may provide required electrical power and control signals to the reverse osmosis module 164 that direct and enable the reverse osmosis module 164 to substantively extract water volume from the aqueous solution 122 by reverse osmosis. The RO/ED controller 168 is further optionally bidirectionally communicatively coupled to the electro-dialysis module 166 and may provide required electrical power and control signals to the electro-dialysis module 166 that direct and enable the electro-dialysis module 166 to substantively extract additional water volume from the aqueous solution 122 by electro dialysis. The aqueous solution 112 is delivered to the reverse osmosis module 164 by energizing the third motorized fluid supply pump SP03 via a length of tubing 144. After some water volume 104 is extracted from the aqueous solution 112 by the reverse osmosis module 164, the resultant aqueous solution 112 is delivered to the electro dialysis module 166 from the reverse osmosis module 164 by energizing the second motorized fluid output pump OP02. The RO/ED controller 168 is additionally optionally electrically coupled to the second motorized fluid output fluid pump OP02 and selectively provides electrical power to energize the second motorized fluid output fluid pump OP02 to enable transfer of the aqueous solution 112 from the reverse osmosis module 164 and to the electro dialysis module 166.

The RO/ED controller 168 and/or the control module 200 may optionally or additionally be coupled to the third motorized fluid supply pump SP03 and/or the third motorized fluid return pump RP03 and selectively energize the third motorized fluid supply pump SP03 and/or the third motorized fluid return pump RP03 to enable a delivery of the aqueous solution 112 to the reverse osmosis module 164 and return of water volume 104 from the reverse osmosis module 164 to the reaction chamber 124. The RO/ED controller 168 and/or the control system 118 may further optionally or additionally be coupled to the fourth motorized fluid return pump RP04 and selectively energize the fourth motorized fluid return pump RP04 to enable a return of water volume 104 from the electro dialysis module 166 to the reaction chamber 124. The RO/ED controller 168 and/or the control system 118 may further optionally or additionally be coupled to the first motorized fluid output pump OP01 and selectively energize the first motorized fluid output pump OP01 to enable transfer of the output solution 128 from the electro dialysis module 166 to the holding tank 130. The holding tank 130 may be or comprise one or more walls, floor wall, and/or ceiling comprising polyvinyl chloride or other suitable material known in the art.

An optional or additional RO/ED tubing length 172 may couple the reverse osmosis module 164 and the fourth motorized fluid return fluid pump RP04 and may enable the fourth motorized fluid return fluid pump RP04 to drive water volume from both the reverse osmosis module 164 and the electro dialysis module 166 and into the reaction chamber 124. The RO/ED tubing length 172 may be or comprise perforated polyvinyl chloride piping and/or other suitable and substantively chemically inert material known in the art.

Figure 2:
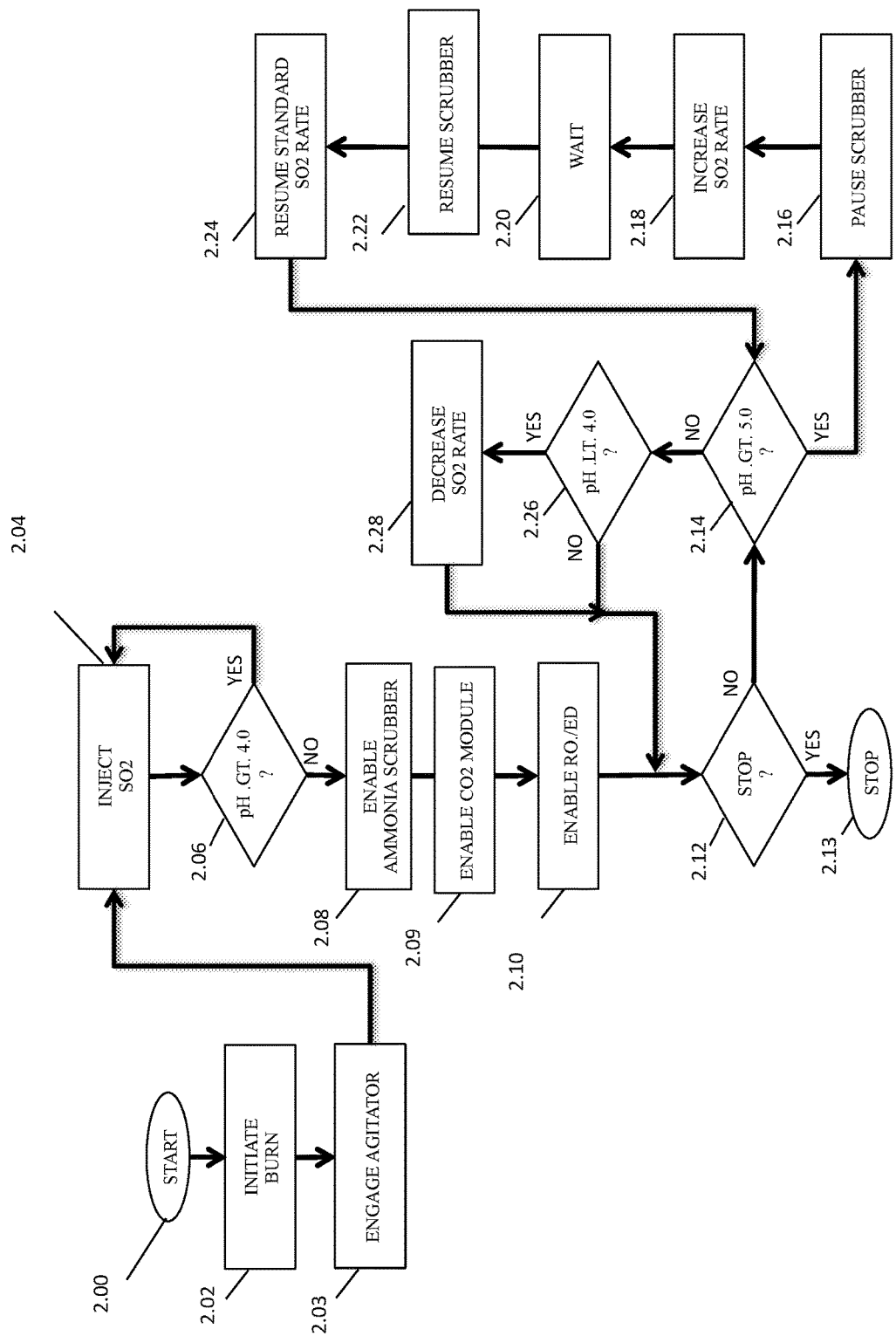
FIG. 2 is a flow chart of a first preferred embodiment of the invented method (hereinafter, "first method") that may be implemented by the first system of FIG. 1B and having optional aspects that may be implemented by the second system of FIG. 1C.
Figure 6:
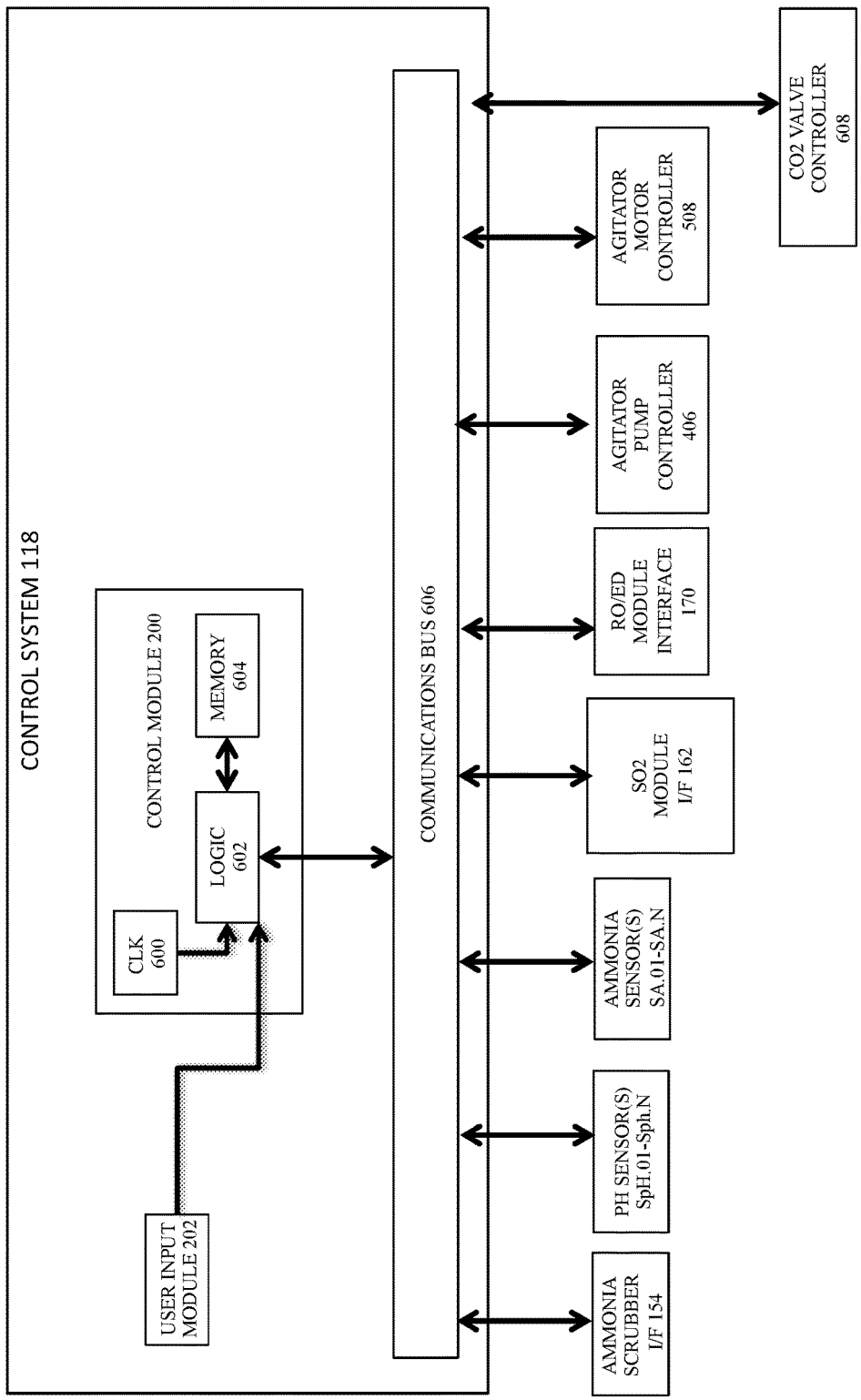
FIG. 6 is a schematic diagram of an optional internal control system of the first system of FIG. 1A with optional modules that extend control to the second system of FIG. 1B.
Figure 7:
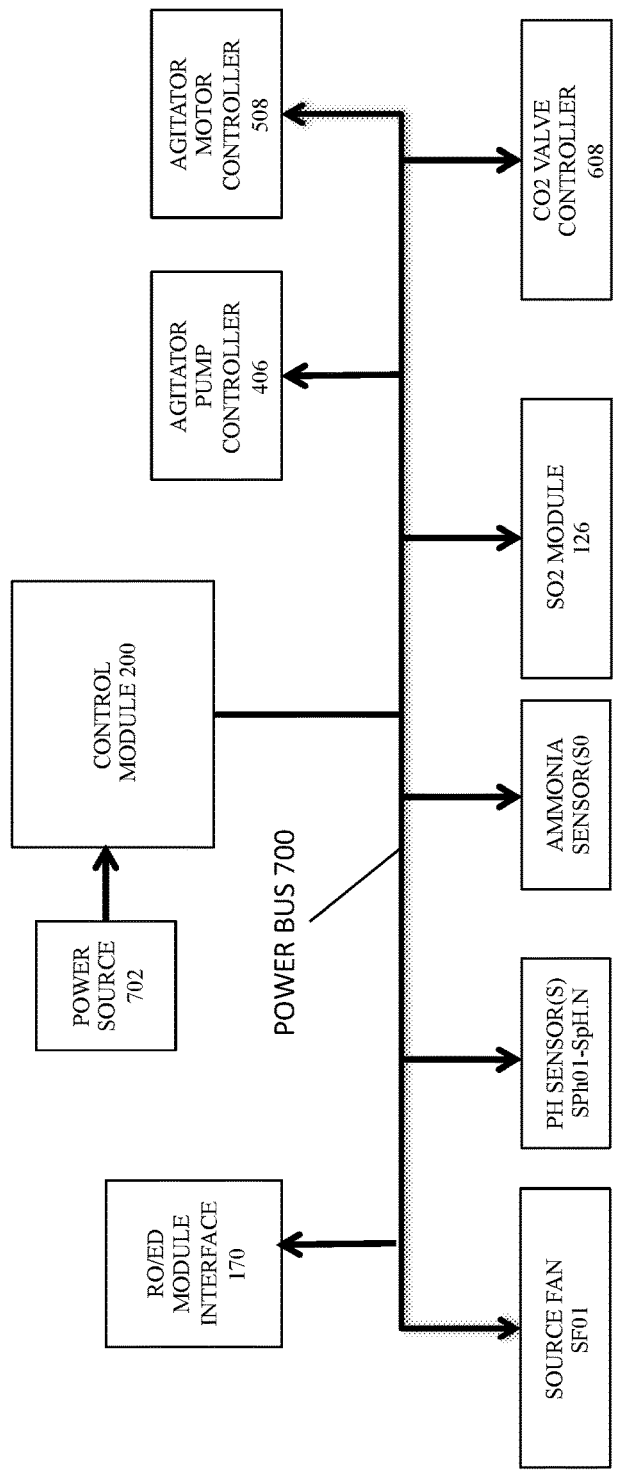
FIG. 7 is a schematic diagram of a controlled power distribution network of the control system of the first system of FIG. 1A and including optional elements of the second system of FIG. 1B.

Referring now generally to the Figures and particularly to FIG. 2, FIG. 6 and FIG. 7, FIG. 2 is a software flow chart implemented by of the control system 118. In step 2.02 a command is sent from a control module 200 of the control system 118 to the sulfur dioxide module 126 to ignite the sulfur 106. In optional step 203 the control module 200 directs, and electrically powers, the agitator module 138 to agitate the source material 121 and to thereby sponsor bacterial activity that will generate gaseous ammonia 102 and optionally carbon dioxide within the enclosure 120. The volume of gaseous ammonia preferably includes molecules of NH3 and molecules of NH4+.

In step 2.02 another command is sent from the control module 200 in step 2.04 to (a.) energize motorized fluid pumps SP02 & RP02 to circulate water volume 104 and (b.) inject the resultant sulfur dioxide gas 110 via the pressure column 158 into the water volume 104 to generate the aqueous solution 112. In step 2.06 the control module 200 accepts pH sensors SPh.01-SPh.N positioned within or proximate to the reaction chamber 124 to determine the pH of aqueous solution 112, and when the pH of the aqueous solution is not sensed to be greater than 4.0, the control system 118 directs the sulfur dioxide module 126 to simply continue inject sulfur dioxide 110 into the aqueous solution 112 until the aqueous solution 112 is measured by the pH sensors SPh.01-SPh.N to have exceeded a magnitude of approximately 4.0.

When the control module 200 receives a pH reading in step 2.06 greater than 4.0 from the pH sensors SPh.01-SPh.N, the control module 600 proceeds on to step 2.08 and energizes the ammonia scrubber 122 in step 2.08, whereby the ammonia scrubber 122 circulates the aqueous solution 112 through the ammonia scrubber 112 and exposes the aqueous solution 112 to the source ammonia gas 112. In optional step 2.09 the control system 118 directs an optional carbon dioxide module 202, as further disclosed in reference to FIG. 11, to initiate delivery of carbon dioxide into the aqueous solution 112 within the reaction chamber 124.

The control module 600 directs the RO/ED module 116 in step 2.10 to circulate the aqueous solution 112 through the RO/ED module 116 and to generate an output solution 128 for storage in the output holding tank 130.

In step 2.12 the control module 600 determines whether to continue the process of step 2.04 through 2.10, whereby portions of the aqueous solution are substantively continuously and contemporaneously circulated to and from the reaction chamber 124 and (a.) the sulfur dioxide module 126 to receive sulfur dioxide; (b.) the ammonia scrubber 122 to absorb source ammonia gas 102; and (c.) the RO/ED module 116 to filter out components, e.g., ammonium sulfate; and to generate the output solution 128. It is understood that the output solution contains (a.) a portion of the water volume 104 and (b.) one or more non-aqueous components of the aqueous solution 112 that have been separated from the aqueous solution 112 by the RO/ED module 116. The control module 200 might, for example, be programmed to proceed to step 2.13 and to shut down the first system 100 or the second system 136 when an ammonia gas detector SA01 sends a measurement that indicates that that the concentration of the source ammonia gas 102 within the atmospheric gas 114 within the enclosure 120 is less than a pre-specified amount, e.g., less than one parts per million per volume unit.

In the alternative, in step 2.12 a human operator may direct the control system via an input module 202 to cease operations and proceed to step 213 and to shut down the first system 100 or the second system 200.

The control system 118, in accordance with its structure, inputs and programming, may proceed from step 2.12 and to execute the loop of steps 2.14 through 2.28, whereby the control system 118 directs the first system 100 or the second system 136 to maintain a pH of the aqueous solution 112 approximately within a preferred range, such as approximately within the range of from 4.0 to 5.0 plus or minus five percent.

When the control module 200 determines in step 2.14 that the pH of the aqueous solution 112 is measured to be greater than 5.0, the control system 118 proceeds on to step 2.16 and pause the activity of the ammonia scrubber 122 in circulating and exposing aqueous solution 112 for absorption of ammonia gas 102 and in step 2.18 directs the sulfur dioxide module 126 to increase the rate of introduction of sulfur dioxide 110 into the aqueous solution 110. An optional wait step 2.20 imposes a wait state of a predetermined time, and in step 2.22 the control system 118 directs the ammonia scrubber 122 to resume circulating aqueous solution 112 and causing absorption of the source ammonia gas 102 into the aqueous. The control system 118 directs the sulfur dioxide module 126 to resume a preprogrammed or pre-specified standard rate of introduction of sulfur dioxide 110 into the aqueous solution.

In the alternative, when the control module 200 determines in step 2.14 that the pH of the aqueous solution 112 is not measured to be greater than 5.0, the control system 118 proceeds on to step 2.26 and to determine if that the pH of the aqueous solution 112 is measured to be less than 4.0. When the control system 118 to determines in step 2.26 that the pH of the aqueous solution 112 is measured to be less than 4.0, the control system 118 directs the sulfur dioxide module 126 to decrease the rate of introduction of sulfur dioxide 110 into the aqueous solution 110 to a certain pre-specified or preprogrammed rate of introduction of sulfur dioxide 110 into the aqueous solution 110. The control module 200 proceeds from either step 2.26 or step 2.28 to step 2.12.

It is understood that alternative control methods to implement the invented method are made obvious to one of ordinary skill in the art in light of the present invention. In certain alternate preferred methods of the present invention, manual control, material input and/or material output may be applied, effected or enabled by a human operator to engage, disengage, turn on and/or turn-off one or more modules 116, 122 & 126, the source fan SF01, one or more motorized fluid pumps OP01, OP02, SP01-SP03 & RP01-RP04.

Figure 3:
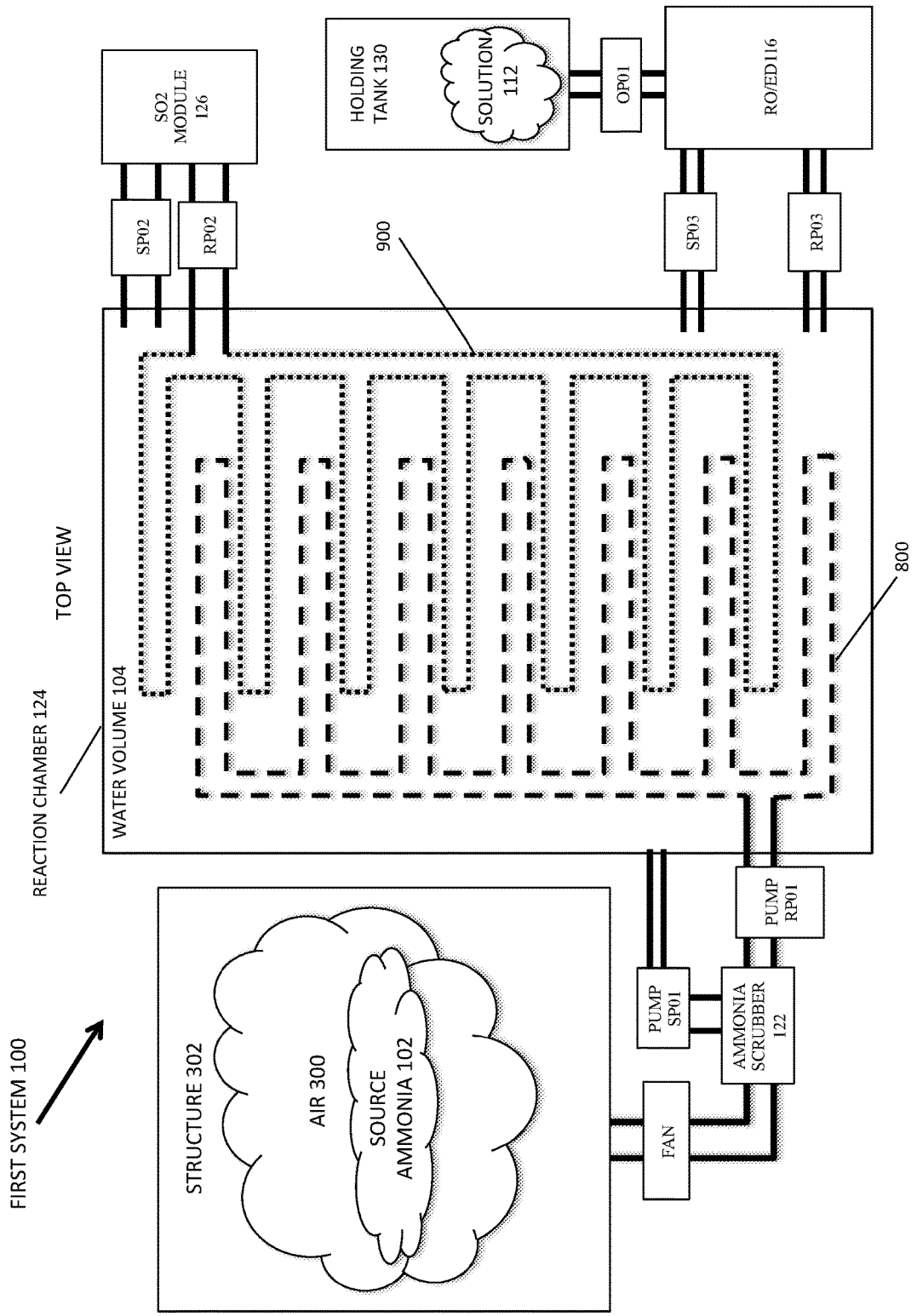
FIG. 3 is a cut-away top view of the first system adapted to decontaminate an internal volume of air of a substantively enclosed and contaminated structure, wherein the enclosed air includes gaseous ammonia.

FIG. 3 is a cut-away top view of the first system 100 adapted to decontaminate the internal volume of air 300 of a substantively enclosed and contaminated structure 302, wherein the enclosed volume of air 300 includes the source gaseous ammonia 102.

Figure 4:
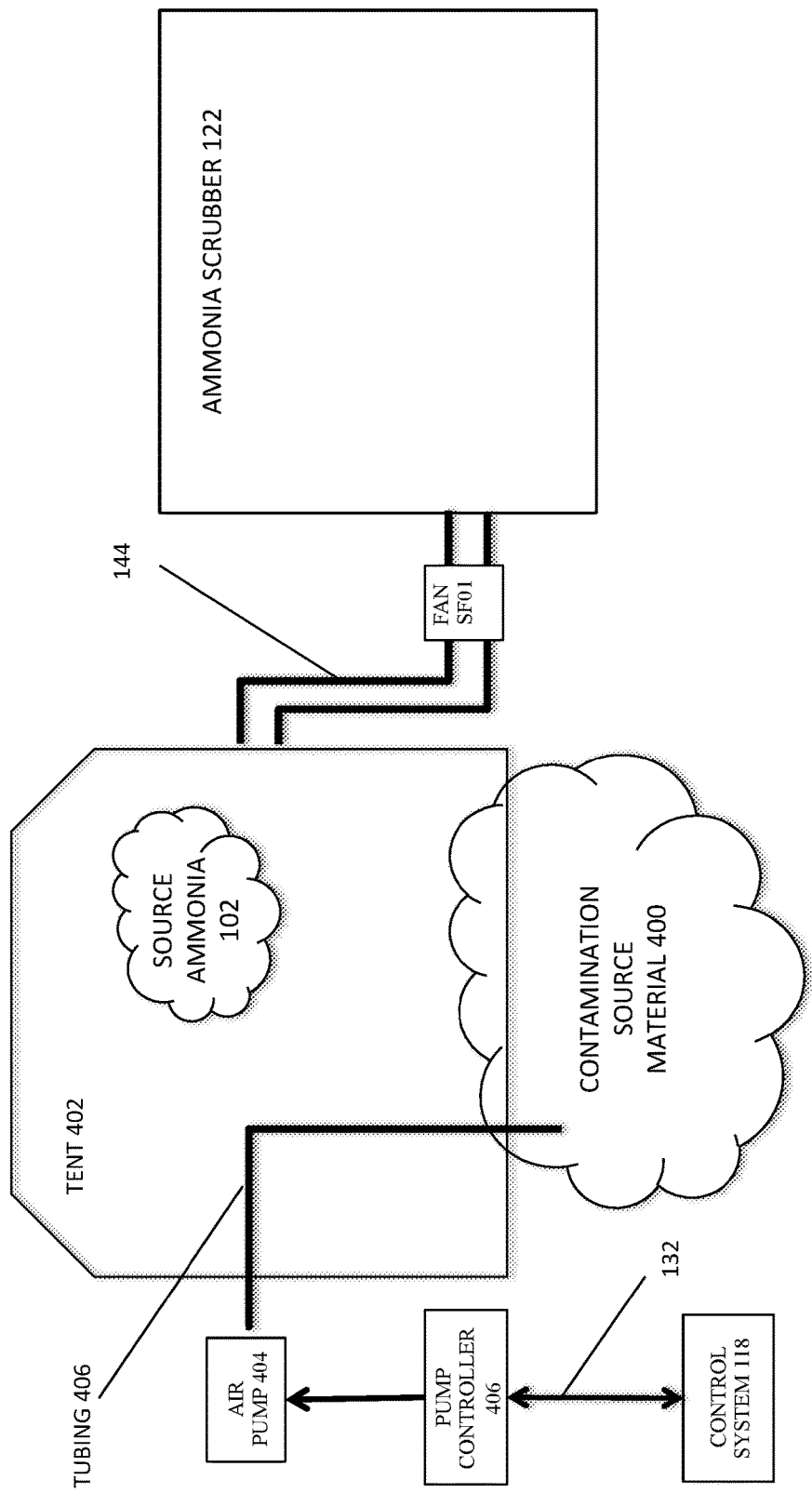
FIG. 4 is a cut-away side view of the first system adapted to remediate a liquid spill, wherein a portable tent source enclosure is placed above and around the liquid spill and an air pump is placed and positioned to pump air into the liquid source material in order to sponsor an accelerated production of source ammonia from the liquid spill by bacterial action.

FIG. 4 is a cut-away side view of the first system 100 adapted to remediate an ammonia gas emitting and substantively liquid material 400, wherein a portable tent source enclosure 402 is placed above and around the substantively liquid material 400 and an optional motorized air pump 404 is placed and positioned to pump air into the liquid spill material 400 through a tubing 406 in order to sponsor an accelerated production of source ammonia 102 from the substantively liquid material 400 by bacterial action. An air pump controller 408 is electrically coupled with both the motorized air pump motor 404 and the power and communications bus 132, whereby the air pump controller 408 receives electrical power to energize the air pump 404 via the power and communications bus 132, wherein the control system 118 selectively and controllably delivers electrical power to the air pump controller 408.

Figure 5:
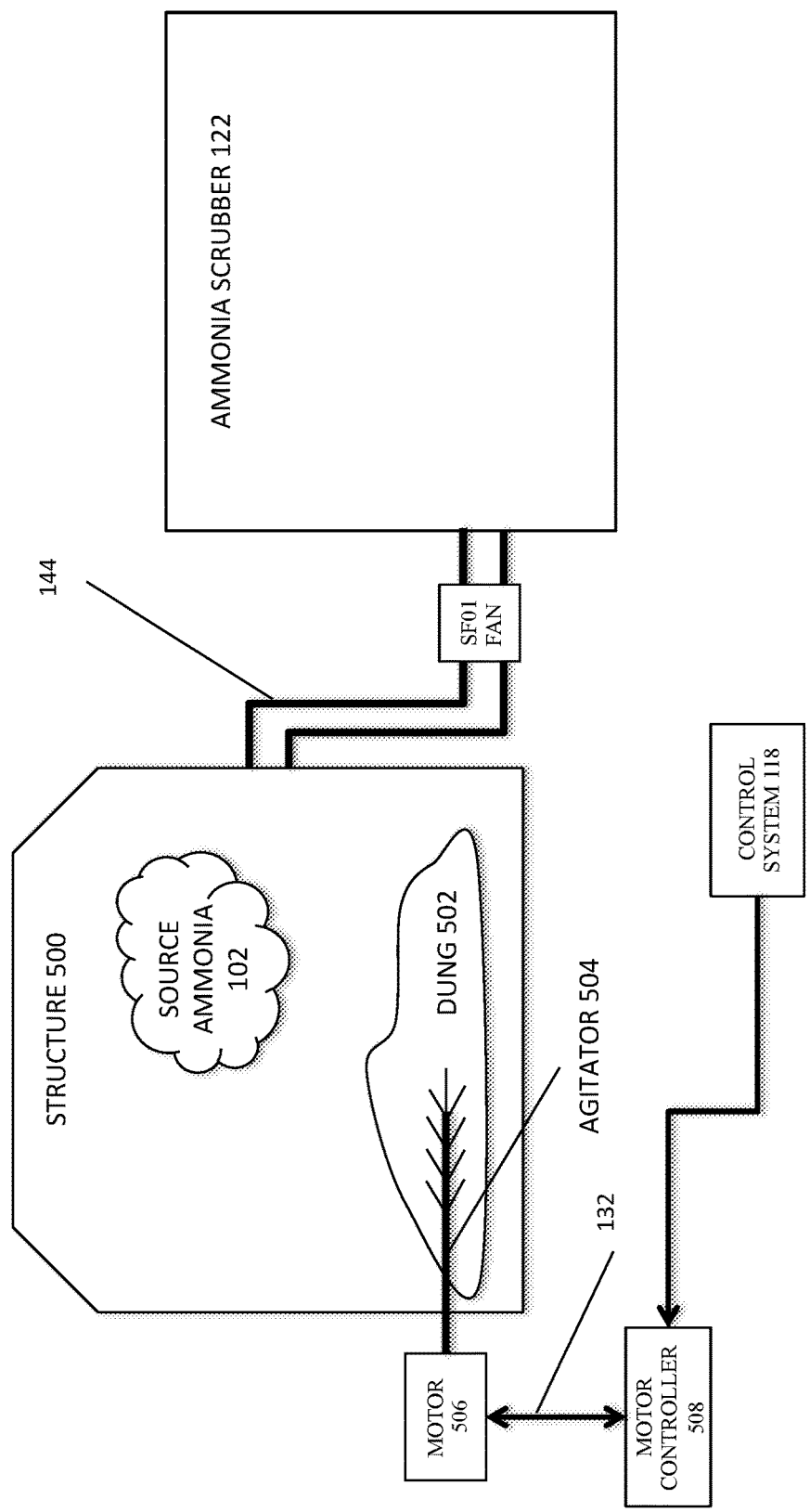
FIG. 5 is an example of the first system enclosing an accumulation of a substantively solid source material that emits ammonia gas, wherein the first system is augmented with a rototiller applied to agitate the solid source material and accelerate the production and capturing of gaseous ammonia.

FIG. 5 is an example of the first system 100 enclosing an accumulation of a substantively solid collection of bird excrement or animal dung 500 (hereinafter, "dung 500") housed within an enclosure 502. The dung 500 emits the source ammonia gas 102. The first system 100 is augmented with a tilling blade 504 that is rotatably coupled with an agitator motor 506. The tilling blade 504 is adapted and applied to mechanically turn over and agitate the dung 500 and thereby accelerate the production and capturing of the gaseous ammonia 102. The An agitator motor controller 508 is electrically coupled with both the agitator motor 506 and the power and communications bus 132 and receives electrical power to energize the agitator motor 506 via the power and communications bus 132, wherein the control system 118 selectively and controllably delivers electrical power to the agitator motor 506. Additionally, alternatively or optionally, the agitator motor 506, the tilling blade 504 and the agitator motor controller 508 may be or be comprised within an automated COMPOST-A-MATIC™ in-vessel composting system as marketed by Farmer Automatic of America, Inc. of Register, Ga. or other suitable motorized or automated tilling system known in the art. It is understood that the agitator module 138 may optionally or alternatively be or comprise an isolated stand-alone system that is not coupled with the power and communications bus 132 and receives an independent feed of electrical power.

FIG. 6 is a schematic diagram of an optional internal control system 118 of the first system 100 with optional modules that extend control to the second system 136. The control module 200 includes a real time clock 600 coupled with a logic controller 602. The logic controller 602 may be coupled with an optional memory 604. The logic controller 602 may be a programmable logic unit that directs the first system 100 to perform the invented method, to include the aspects of the method of FIG. 2, and/or the logic control 602 might be configured or adapted to execute programming of a software program stored within the memory 604. The control module 200 is bi-directionally communicatively coupled by means of a communication bus 606 with the ammonia scrubber interface 154, the sulfur dioxide module interface 162, the RO/ED module 116, one or more pH sensors SpH.01-Sph.N and one or more ammonia gas concentration sensors SA.01-SA.N. The communication bus 606 is preferably comprised within the power and communications bus 132.

The control module 200 may optionally or additionally be coupled with the agitator motor controller 504 and/or the agitator pump controller 406. The control module 200 may be further optionally or additionally be coupled with a carbon dioxide valve controller 608 of the carbon dioxide source module 202 of the second system 136, and as further disclosed in reference to FIGS. 6, 7 and 11.

FIG. 7 is a schematic diagram of a controlled power distribution network 700 of the control system 118 of the first system 100 of FIG. 1A and including optional elements of the second system 136. The power distribution network 700 selectively and as controlled by the control module 200 delivers electric power from an electrical power source 702 to the ammonia scrubber 122, the sulfur dioxide module 126, the RO/ED module 116, one or more pH sensors, one or more ammonia gas concentration sensors, one or more motorized fluid pumps OP01, SP01-SP-04 & RP01-RP-03, and/or the source fan SF01 of the first system 100. Additionally or alternatively, power distribution network 700 selectively and as controlled by the control module 200 delivers electric power from the electrical power source 702 to the agitator pump controller 406, the agitator motor controller 508, and/or the carbon dioxide source valve controller 608.

Figure 8:
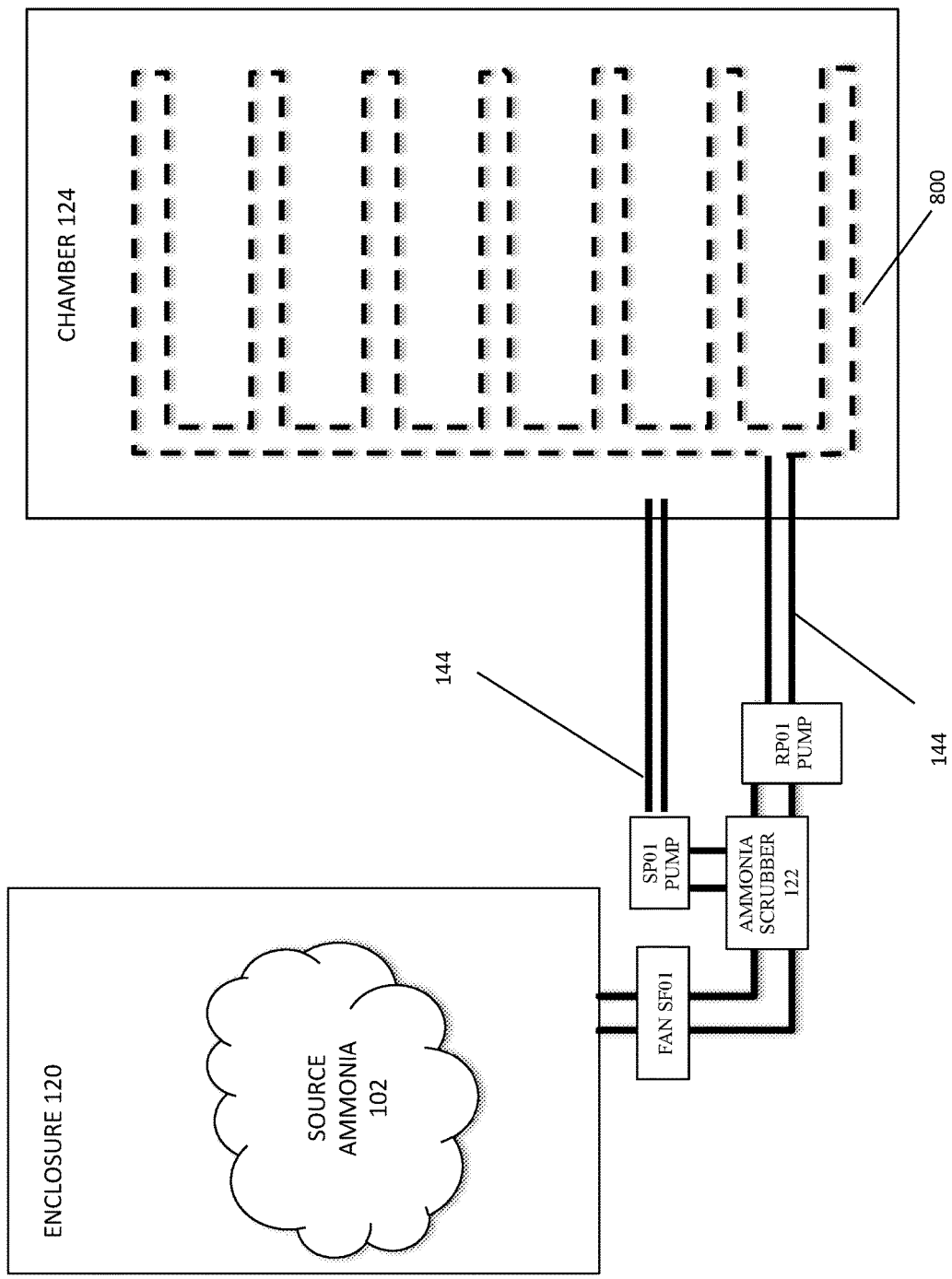
FIG. 8 is a cut-away view of elements of the first system of FIG. 1 that direct gaseous ammonia from the enclosure of the source material and to delivery within the reaction chamber.

FIG. 8 is a cut-away view of an ammonia delivery perforated tubing 800 of the first system 100 that is coupled with an output port of the first return pump RP01 and returns the aqueous solution 112 from the ammonia scrubber 122 and to the reaction chamber 124. The ammonia delivery perforated tubing 800 is adapted and configured to return aqueous solution 112 from the ammonia scrubber 122 and into the reaction chamber 124, and may be or comprise perforated polyvinyl chloride piping and/or other suitable and substantively chemically inert material known in the art.

Figure 9:
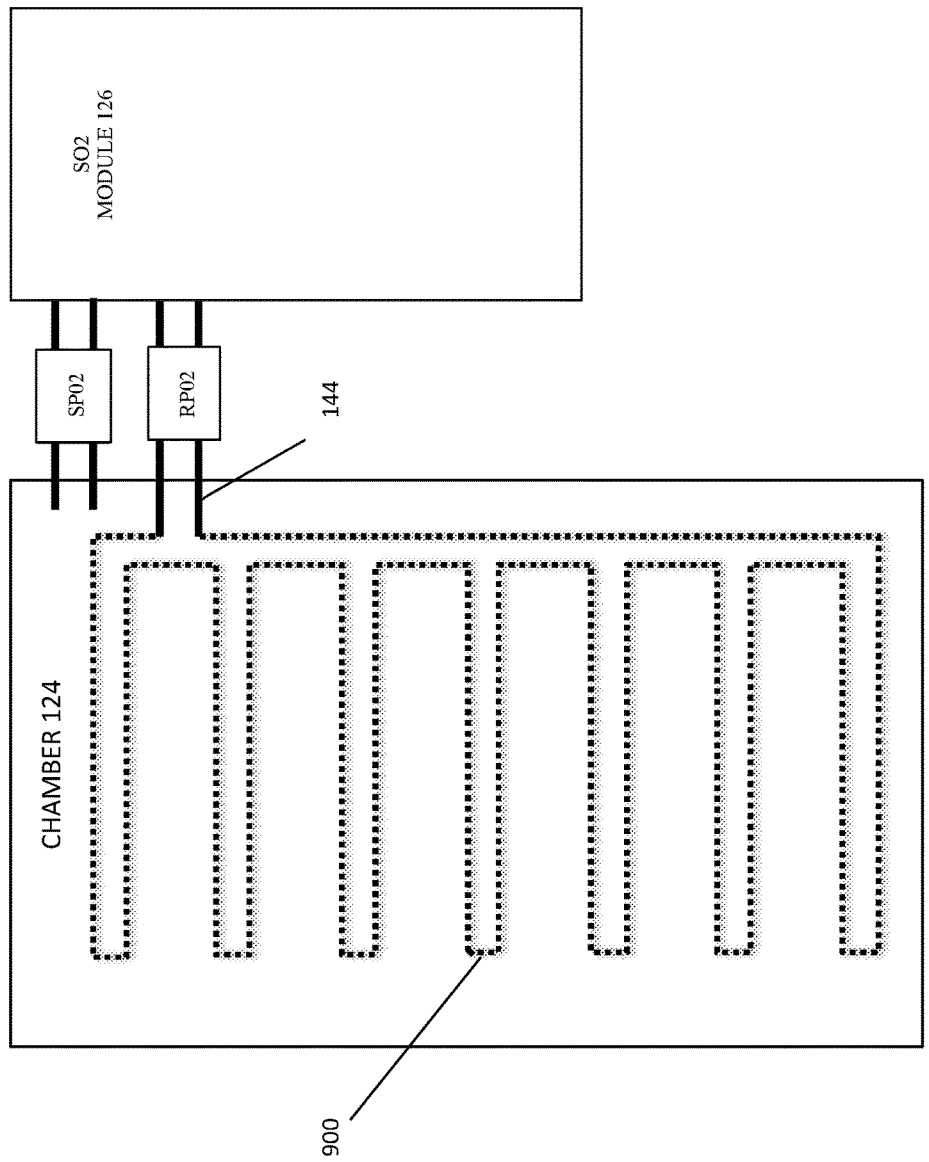
FIG. 9 is a cut-away view of the distribution system for sulfur dioxide within the reaction chamber of the first system of FIG. 1.

FIG. 9 is a cut-away view of a sulfur dioxide delivery perforated tubing 900 of the first system 100 that circulates and returns the aqueous solution 112 from the sulfur dioxide module 126 and to the reaction chamber 124. The sulfur dioxide delivery perforated tubing 900 is adapted and configured to return aqueous solution 112 from the sulfur dioxide module 126 and into the reaction chamber 124. The sulfur dioxide delivery perforated tubing 900 may be or comprise perforated polyvinyl chloride piping and/or other suitable and substantively chemically inert material known in the art.

Figure 10:
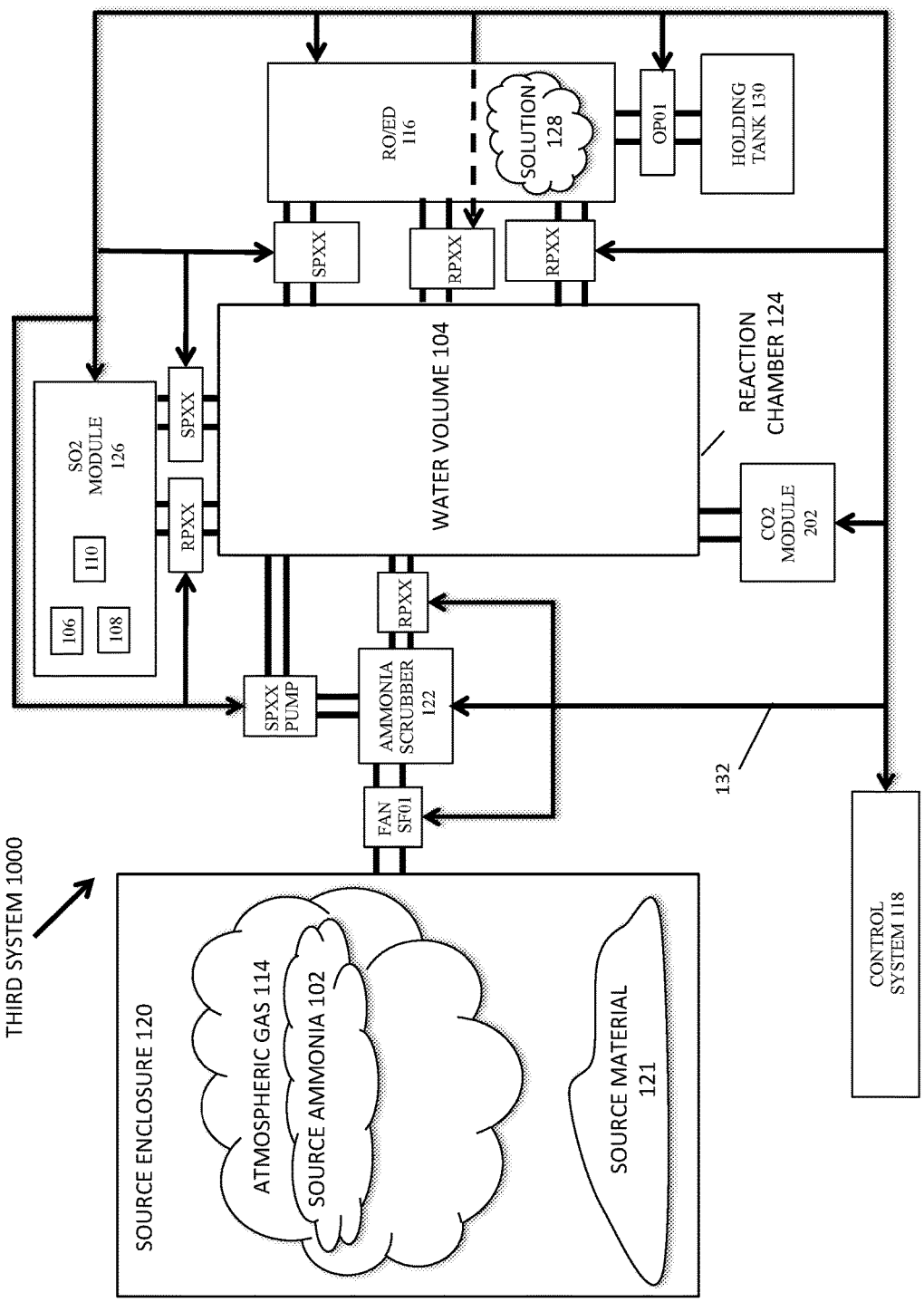
FIG. 10 is a block diagram of a third alternate preferred embodiment of the present invention (hereinafter, "third system") wherein a source of pressurized carbon dioxide is provided and is adapted to deliver gaseous carbon dioxide into the water volume and within the reaction chamber of the first system of FIG. 1.
Figure 11:
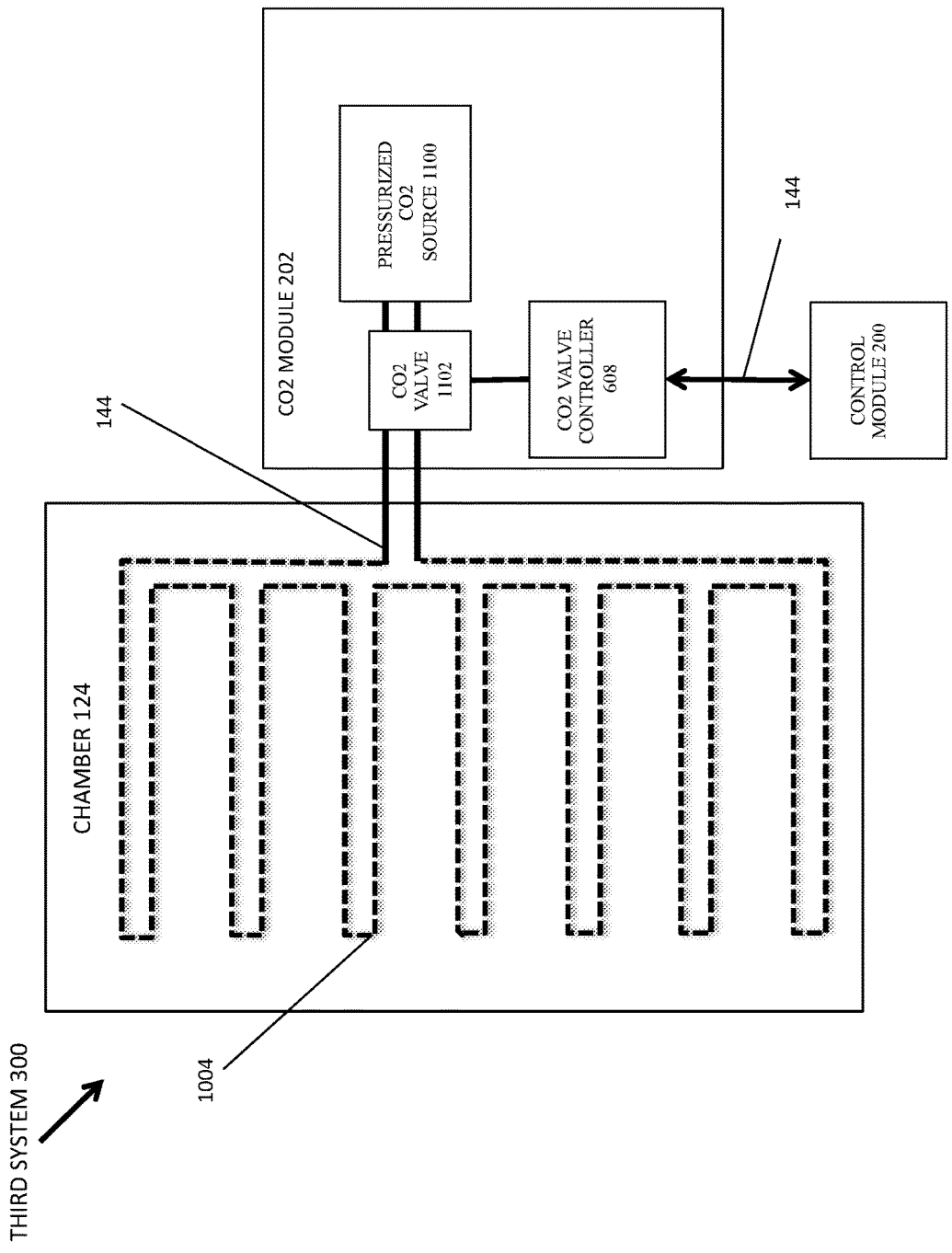
FIG. 11 is a cut-away view of the distribution system for carbon dioxide within the reaction chamber of the third system of FIG. 11.

Referring now generally to the Figures and particularly to FIG. 10 and FIG. 11, FIG. 10 is a block diagram of a third alternate preferred embodiment of the present invention 1000 (hereinafter, "third system 1000") comprising the carbon dioxide module 202 coupled with the first system 100. As disclosed in FIG. 11, the carbon dioxide module 202 comprises a source of pressurized carbon dioxide 1100 and is adapted to deliver gaseous carbon dioxide into the water volume 104 and within the reaction chamber 124 via a length of the chemically inert tubing 144. A pressure release valve 1102 is coupled with the source of pressurized carbon dioxide 1100 and a carbon dioxide delivery tubing 1004 via the length of the chemically inert tubing 144. The carbon dioxide perforated delivery tubing 1004 located within the reaction chamber 124 and is adapted to accept carbon dioxide from source of pressurized carbon dioxide 1100 and via the pressure release valve 1102. The carbon dioxide valve controller 608 controls opening and closing of the pressure release valve 1102 and receives commands and electrical power from the control module 200 via communications and power bus 132, whereby the control system 118 directs, starts, stops and controls introduction of carbon dioxide into the aqueous solution 112 from the source of pressurized carbon dioxide 1100. The carbon dioxide perforated tubing 1004 may be or comprise perforated polyvinyl chloride piping or other suitable and substantively chemically inert material known in the art.

Figure 12:
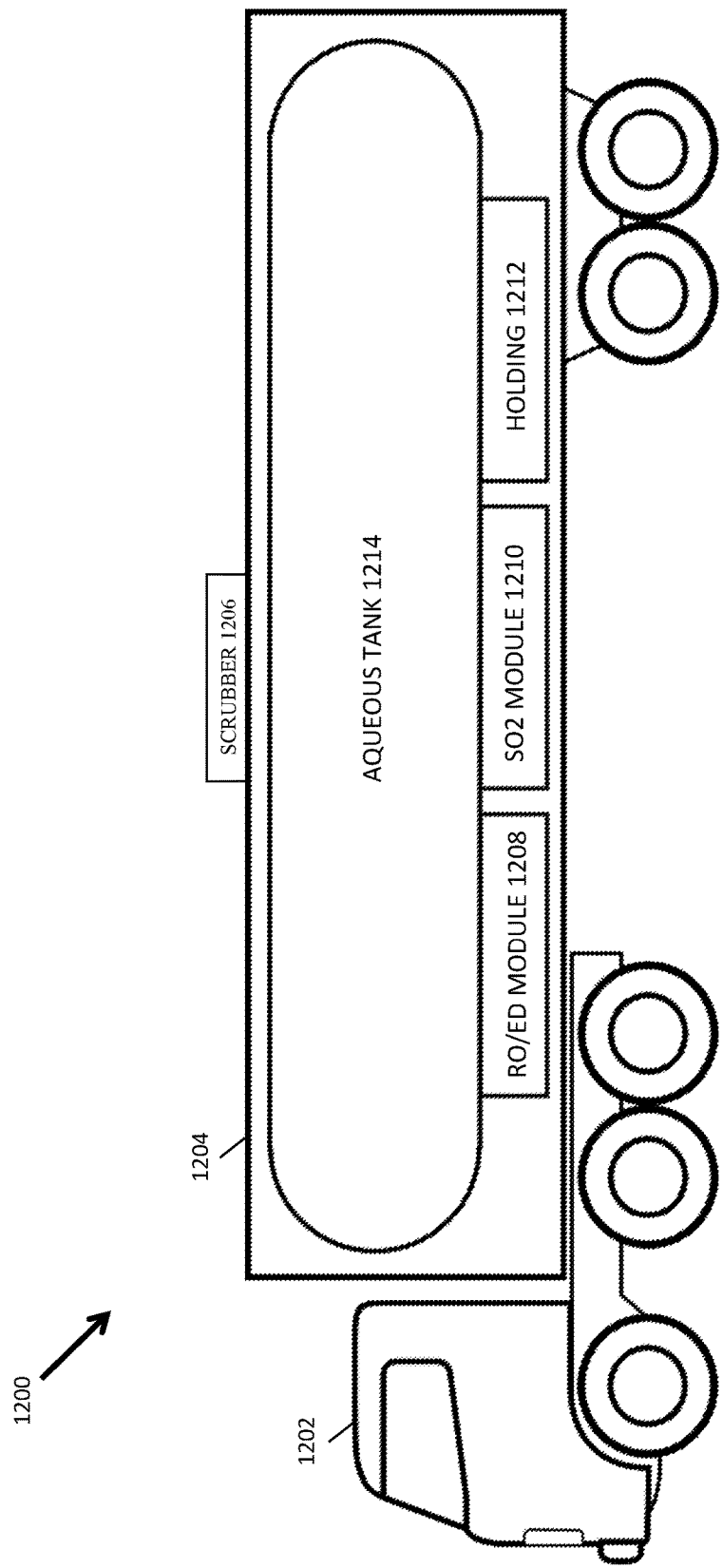
FIG. 12 is an illustration of a fifth motorized embodiment of the first system of FIG. 1B.

FIG. 12 is an illustration of a motorized embodiment 1200 of the first system 100. The motorized embodiment includes a motorized cab 1202 and a wheeled trailer 1204, wherein the motorized cab 1202 is adapted to detachably engage with the wheeled trailer 1204 and transport portable an ammonia gas scrubber 1206, an RO/ED module 1208, a sulfur dioxide module 1210, a components holding tank 1212 and a resultant components holding tank 1212.

Figure 13:
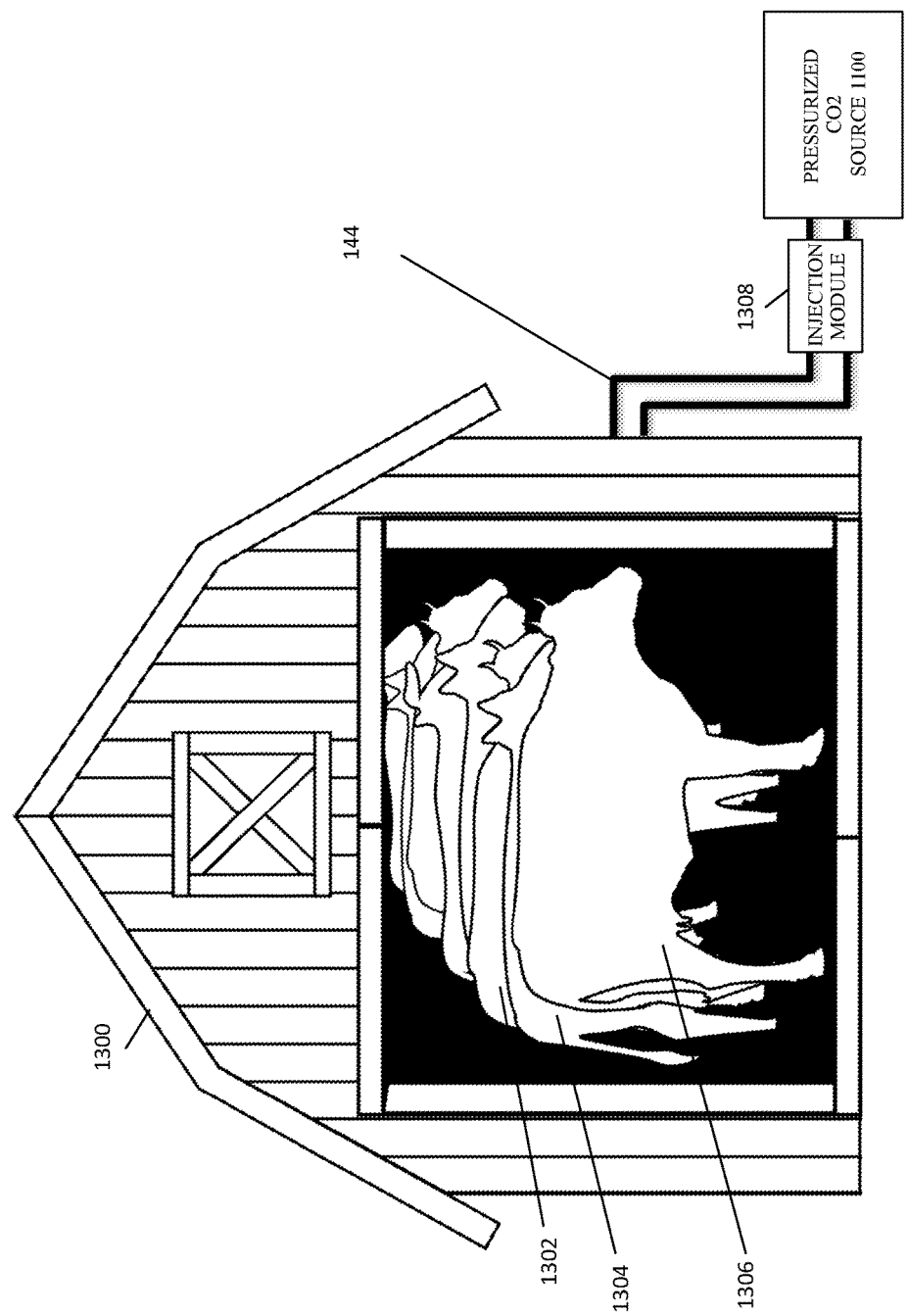
FIG. 13 is an illustration of a carbon dioxide generation module that accepts mammalian exhalation a source of gaseous carbon dioxide as coupled with the third system of FIG. 10.

FIG. 13 is an illustration of a carbon dioxide generation 1300 module that accepts mammalian exhalation a source of gaseous carbon dioxide. An enclosed animal barn 1300 substantively encloses a plurality of mammalian livestock 1302-1306. An injection module 1308 receives carbon dioxide sourced from the mammalian livestock 1302-1306 via a length of the tubing 144. The injection module 1308 pressurizes the received carbon dioxide and injects the pressurized carbon dioxide into the pressurized carbon dioxide source 1100 via the tubing 144.

Referring now generally to the Figures and particularly to FIGS. 14, 15 and 16, FIG. 14 discloses aspects and steps 14.00-14.22 of a sixth alternate preferred embodiment of the invented method (hereinafter, "the sixth method"), FIG. 15 discloses material, equipment and equipment modules 15A-15R that may be employed in one or more steps or aspects 14.00-14.22 of the sixth method, and FIG. 16 discloses inventive materials, aspects and elements 16A-16E that may optionally be applied in an instantiation of the sixth method and various alternate preferred embodiments of the present invention.

Figure 14:
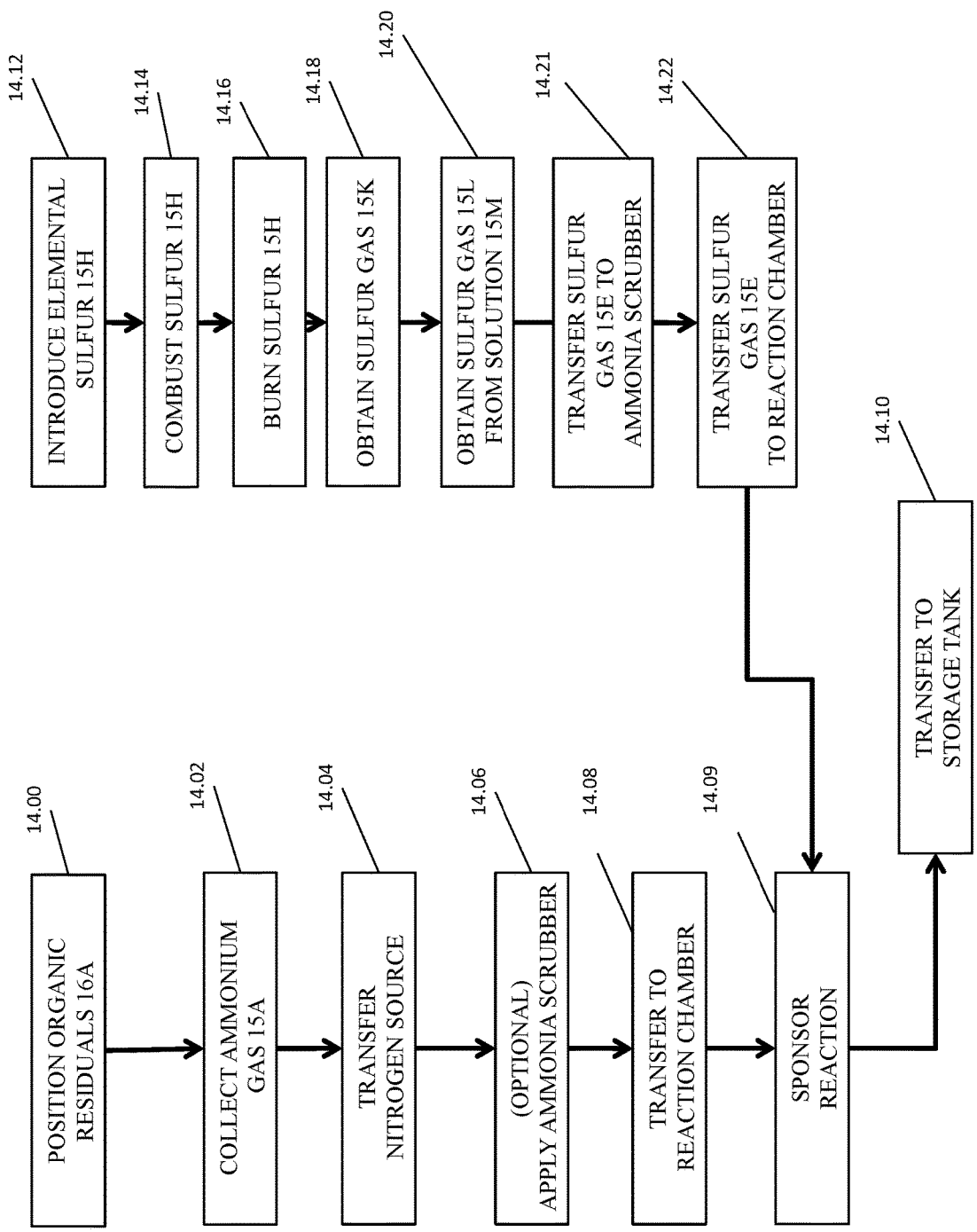
FIG. 14 is an alternate sixth preferred embodiment of the invented method showing process outline comprising aspects of the invented method.

More particularly FIG. 14 is a process diagram of the sixth method. In step 14.00 a biomass 16A of organic residuals, e.g., chicken litter and/or other ammonia generating and/or comprising organic materials, is positioned, preferably within an enclosure 102 as shown in FIG. 16, and enabled to emit a quantity of ammonium gas 15A into a mixture of atmospheric gases 15B in step 14.02. The ammonium gas 15A may be captured in step 14.02 as a component of a mixture of atmospheric gases 15B or optionally selected from the atmospheric gases 15B. Optional aspects and equipment related to the production of ammonium gas 15A are elaborated in FIG. 16.

The ammonium gas 15A and/or atmospheric gases 15B are optionally passed through an ammonium gas scrubber 15C in optional step 14.06. The ammonium gas 15A is delivered in step 14.08 into a reaction chamber 15D, and/or optionally as a component of the mixture of atmospheric gases 15B of step 14.02 and/or as an output from the ammonium gas scrubber 15C. The ammonium gas 15A delivered into the reaction chamber 15D in step 14.08 is thereupon brought into contact with, and permitted to react with, the second reactant sulfur dioxide 15A in step 14.09, whereupon an output mass of ammonium sulfate 15F is formed. The mass of ammonium sulfate 15F is then transferred into a storage tank 15G in step 14.10 and made available for immediate use, or alternately collected and made available for later transport and use, Referring now to steps 14.12 through 14.20, a second reactant sulfur dioxide 15E is disclosed to be generated from one or a combination of sources. In optional step 14.12 a mass of elemental sulfur 15H is secured and thereupon is combusted in step 14.14 by means of a sulfur burning system 15I. In one optional variation of the present invention, the sulfur burning system 15I is or comprises an a sulfur dioxide burner system as marketed by Harmon Systems International, LLC of Bakers field, Calif., whereby the second reactant sulfur dioxide 15E is generated by combustion of the elemental sulfur 15H in optional step 14.16 by burning the elemental sulfur 15H with a propane torch (not shown) to generate a first mass of sulfur dioxide gas 15J containing the second reactant sulfur dioxide 15E.

Alternatively or additionally, a second mass of gaseous sulfur 15K may be obtained and delivered in step 14.18. Further alternatively or additionally, a third mass of gaseous sulfur 15L may be extracted from a liquid mass 15M of a solution containing sulfur in step 14.20 by an extraction system 15P.

The second reactant sulfur dioxide 15E as generated or obtained in steps 14.14-14.20 may optionally be transferred into the scrubber in optional step 14.21.

The second reactant sulfur dioxide 15E as generated or obtained in steps 14.14-14.20 is transferred into the reaction chamber 15D in step 14.22 to enable reaction with the mass of ammonium gas 15A in step 14.10. It is understood that the second reactant sulfur dioxide 15E may be or comprise, in singularity or combination, the solid sulfur 15H of step 14.12, the first mass of sulfur dioxide gas 15J of step 14.16, the second mass of gaseous sulfur 15K of step 14.18, and/or the third mass of gaseous sulfur 15L of step 14.20.

Figure 15:
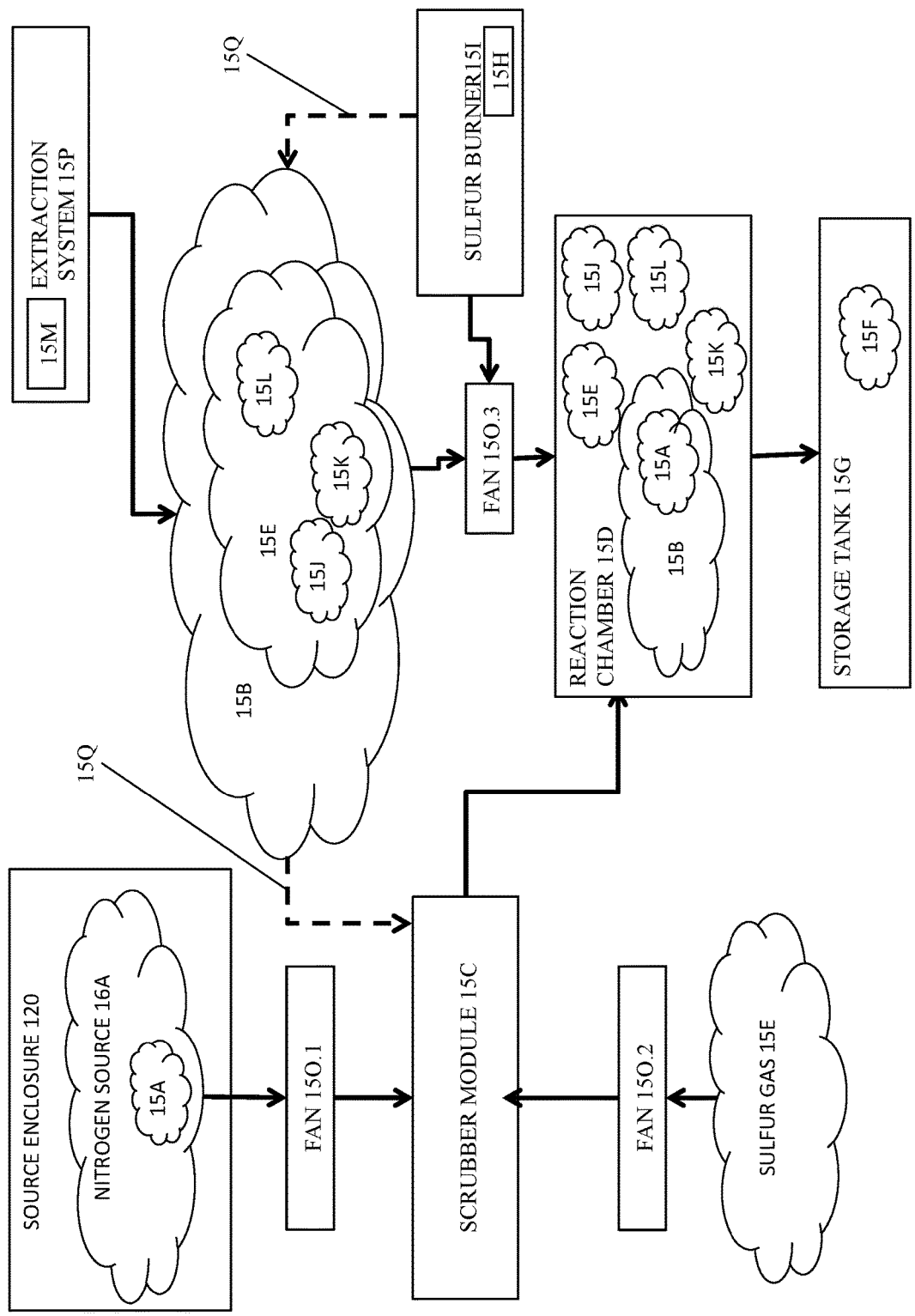
FIG. 15 is a schematic diagram of equipment and structures comprising an optional preferred setup of a production facility enabled for implementation of the sixth preferred embodiment of the invented method of FIG. 14.

Referring now to the Figures and particularly to FIG. 15, FIG. 15 is a schematic diagram of an additional optional embodiment of a production facility 15N wherein aspects of the sixth method, and other alternate preferred embodiments of the invented method, may be instantiated or implemented.

The source ammonium gas 15A is emitted from the organic source material biomass 16A containing ammonium and/or ammonium compounds. A first fan 150.1 is adapted to withdraw the source ammonia gas 15A into an ammonia scrubber module 15C. The ammonia scrubber module 15C and the reaction chamber 15D are connected via a circulation system and are both coupled to the sulfur source enclosure 120. A sulfur dioxide generation module, either the sulfur gas 15A & 15J-15L from elemental sulfur combustion of step 14.14 of the method of FIG. 14 or extracted sulfur from sulfur water source 15M, is also coupled with the reaction chamber 15D. As the reaction solution circulates through the scrubber 15C and reaction chamber 15D, the concentrate output is transferred into the storage tank 15G.

It is understood that the ammonia scrubber 15C may be or comprise a suitable and commercially available gas scrubber known in the art, and that the source fan may be comprised within the ammonia scrubber 15C. It is further understood that the tubing connecting the source nitrogen gas 15A and scrubber 15C may be or comprise polyvinyl chloride piping or other suitable and preferably substantively chemically inert material known in the art.

The concentrated output solution may thus include ammonium sulfate as a solute or component, whereby ammonium sulfate is produced in a manner that is in conformance one or more governmental, regulatory or organizational standards and the resultant ammonium sulfate may receive a certification of a preferred or particular origin, such as a being certified, graded, trademarked or marked as a special type of organic sulfate. It is understood that the receipt of such certifications or authorizations may increase the market value and perceived quality of the resultant ammonium sulfate of the concentrated output solution.

It is also understood that the system in FIG. 15 may include commercially available equipment or their equivalents, wherein the ammonia scrubber 15C may be or comprise, or be comprised within, a wet flue gas scrubber marketed by Deryck A Gibson Ltd. of Kingston Jamaica. In various alternate preferred embodiments of the present invention, the source ammonia gas 15A is present as a mist, a spray or a waterfall as it circulates within the ammonia scrubber 15C. The reaction chamber 15D may comprise sheets, walls, a bottom wall and or/ceiling wall of polyvinyl chloride or other suitable material known in the art.

As indicated in FIGS. 14 and 15, the ambient air 15B and/or gases 15 containing the collected NH3 and CO2 gasses are propelled by a first fan 150.1 to enter scrubber module 15C An optional second fan module 150.2 propels the ambient air 15B and/or gases 15E, 15j, 15K & 15L into the scrubber module 15C. An optional airway 15R enables propels the ambient air 15B and/or gases 15E, 15j, 15K & 15L into the scrubber module 15C by an alternate route. An optional third fan module 150.3 propels the ambient air 15B and/or gases 15E, 15j, 15K & 15L directly into the reaction chamber 15D.

Figure 16:
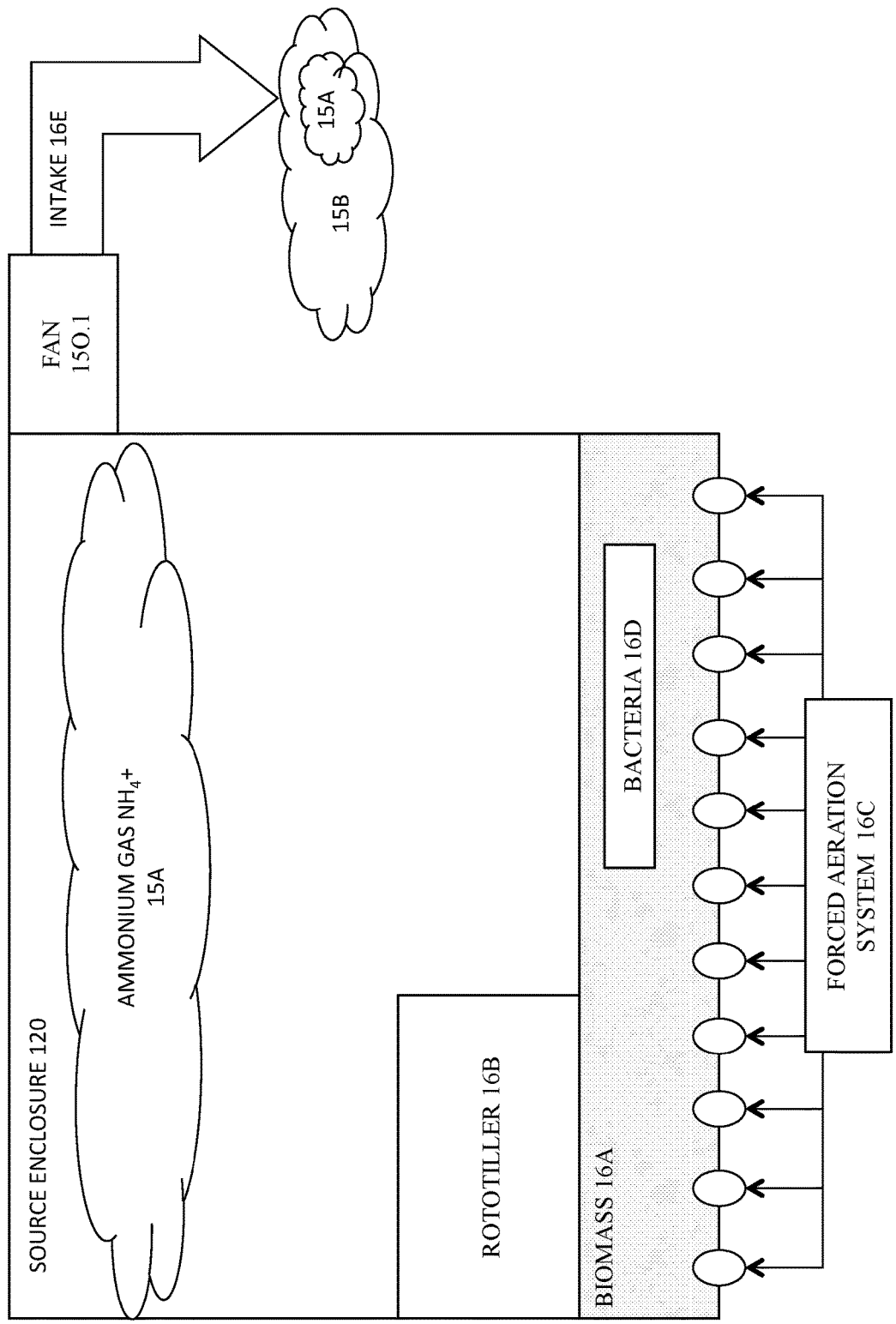
FIG. 16 presents optional aspects and features of certain alternate preferred embodiments of the invented composting apparatus, wherein ammonia gas is produced by highly selective aerobic bacteria action without requiring an addition of external heat energy beyond available ambient heat energy

FIG. 16 demonstrates a yet additional preferred embodiment of the composting apparatus, wherein ammonia gas 15A is produced by highly selective aerobic bacteria 16D action with the biomass 16A and without adding external heat. The composting building, which may be a barn, a shed, a greenhouse, or a specially constructed dedicated facility, can also serve as the ammonia source chamber that contains and shields the organic residuals biomass 16A. According to an embodiment of the invention, the floor of the facility is contained of a layer of organic residuals biomass 16A, as the source of ammonia gas 15A, and is shielded to prevent noxious gases from escaping. A composting trench is built at the same positions as label 16.02 to insulate the biomass from heat loss, and to allow easy aeration and physical movement of the biomass. The composting trench also contains a forced aeration system 16C, injecting oxygen gases to facilitate the action of a mass of aerobic bacteria 16D.

Aerobic bacteria 16D are provided to highly selectively convert all or substantially all of the waste amino acids, proteins, uric acid and any other available nitrogen compounds in the biomass into NH3 and/or NH4 and CO2. Preferably, the specific strains of aerobic bacteria 16D used in the present invention include uricolytic bacteria such as *Bacillus pasteurii* and/or *Peptostreptococcus anaerobius, Clostridium sticklandii, Clostridium aminophilum,* and *Eubacterium pyruvativorans.* Thermophilic bacteria are preferred because their presence reduces the population of harmful bacteria such as *E. coli, Salmonella* and fecal coliform bacteria.

As the composting process commences, a rototiller 16B may be used to mix/agitate and aerate the biomass. In a preferred embodiment, a hood may be used to capture rising water vapor and/or NH3 and/or NH4 and CO2 from the biomass 16A as it generates heat. An intake channel 16E delivers water vapor and/or NH3 and/or NH4 15A from the enclosure 120 and into the scrubber 15C.

Referring now generally to the Figures and particularly to FIGS. 17, 18 and 19, FIG. 19 discloses aspects of a seventh alternate preferred embodiment of the invented method (hereinafter, "the seventh method"), FIGS. 17 and 18 disclose material, equipment and equipment modules 1700-1732 that may be employed in one or more steps or aspects of the seventh method, and FIG. 19 discloses inventive materials, aspects and elements 1900-1914 that may optionally be applied in an instantiation of the seventh method and various alternate preferred embodiments of the present invention.

Figure 17:
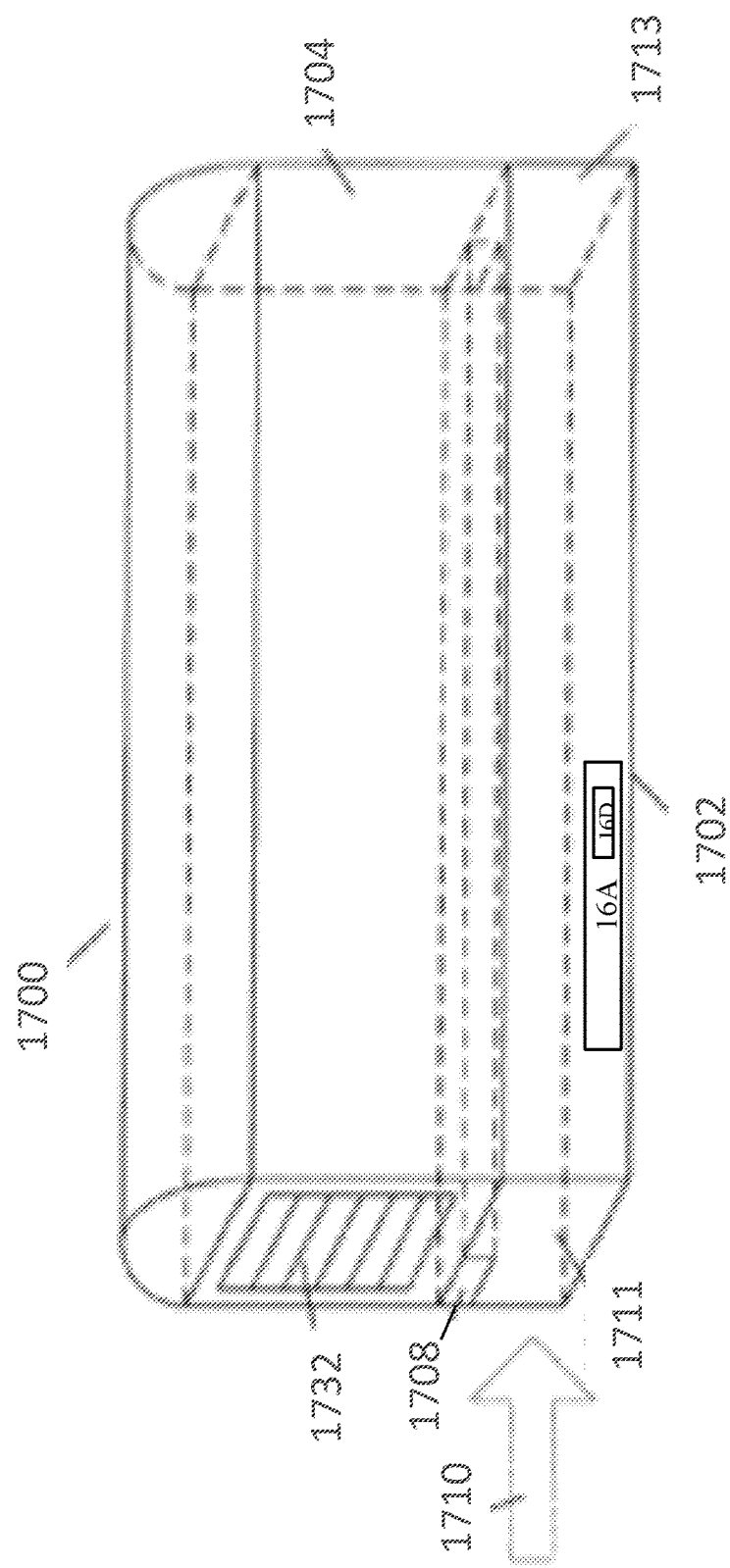
FIG. 17 is a perspective view of a composting apparatus in accordance with a seventh preferred embodiment of the present invention.
Figure 18:
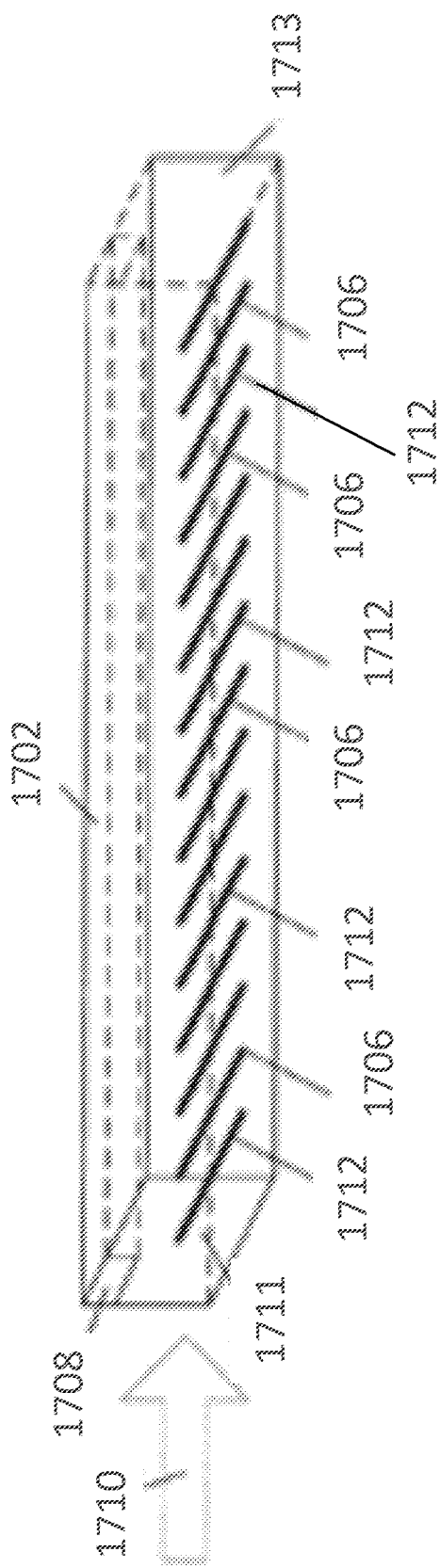
FIG. 18 is a perspective view of composting trench of composting apparatus of FIG. 17.
Figure 19:
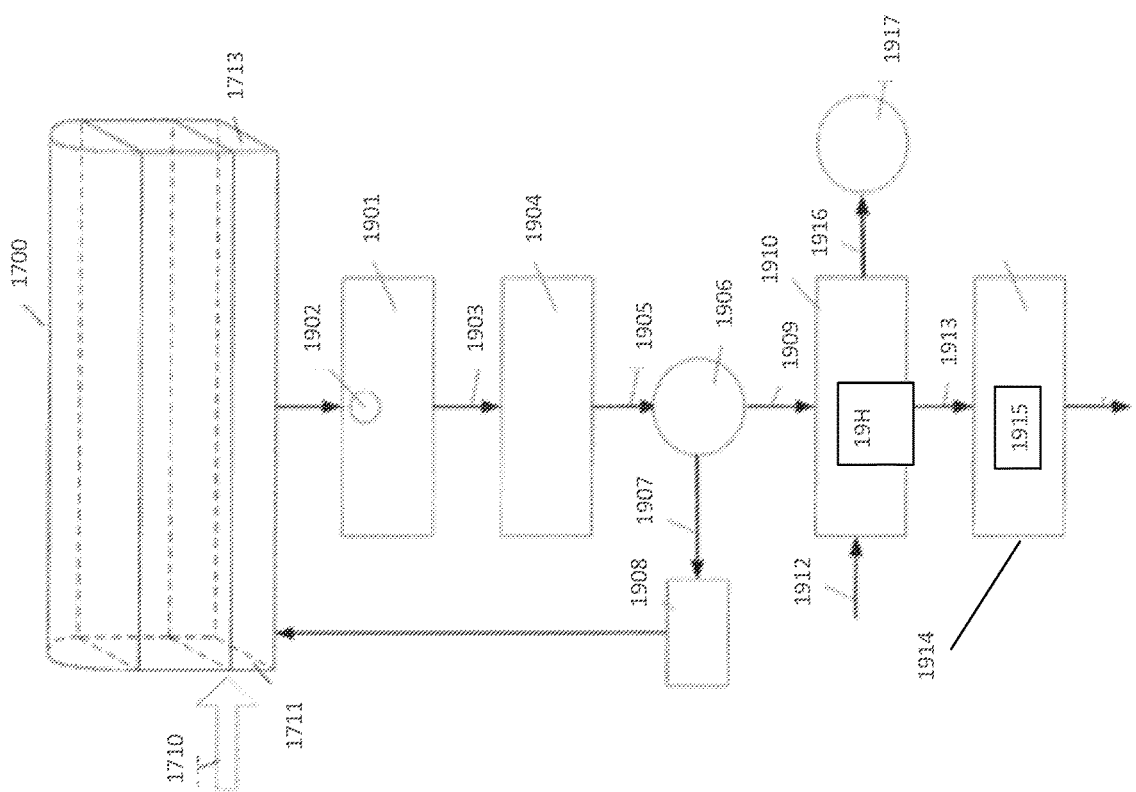
FIG. 19 is a flow chart of organic ammonium sulfate product manufacture process of a seventh preferred embodiment of the method of the present invention.

Referring to FIGS. 17 through 19, a preferred embodiment of a composting apparatus 1700 and a method of producing solid and/or concentrated organic ammonium sulfate product by highly selective aerobic bacteria 16D action without adding external heat, are shown and described. Composting apparatus 1700 is preferably located inside of a composting building 1704. Composting building 1704 may be a barn, a shed, or a greenhouse. In other embodiments, composting building 1704 may simply be a cover or box covering composting trench 1702. Composting building 1704 includes an input end 111, an output end 1713, and a composting trench 1702. Preferably, composting trench 1702 is the receptacle used for composting. Preferably, composting building 1704 contains and shields the composting trench 1702 so that noxious gases cannot escape into the environment. Composting trench 1702 preferably contains the heat generated by the aerobic bacteria 16D action, insulates the biomass from heat loss, and allows easy aeration and physical movement of the biomass. Composting building 1704 preferably contains the means to control the temperature, the moisture, the pH, and the nitrogen content of the biomass in composting apparatus 1700. Composting building 1704 preferably includes steep eaves or a narrowed roof area to allow a more efficient capture and removal of gasses and water vapors from inside the atmosphere of composting building 1704. Composting building 1704 may also include a louvered opening 1732 at the input end 1711. Preferably, louvered opening 1732 may be used for air control. In other embodiments, louvered opening 1732 may be omitted or replaced with another suitable mechanism.

In a preferred embodiment, composting trench 1702 is from about 1 foot to about 10 feet deep; more preferably from about 2 feet to about 6 feet deep; and most preferably from about 4 feet to 5 feet deep. In a preferred embodiment, composting trench 1702 is from about 50 feet to about 500 feet long; more preferably from about 100 feet to about 350 feet long; and most preferably from about 200 to about 300 feet long. In a preferred embodiment, composting trench 1702 is from about 3 feet to about 25 feet wide; more preferably from about 5 feet to about 20 feet wide; and most preferably from about 8 feet to about 14 feet wide. In a preferred embodiment, the dimensions of composting trench 1702 are as follows: about 4 feet deep, about 250 feet long, and about 10 to about 12 feet wide. In other embodiments, composting trench 1702 may have dimensions greater than, less than, or different from those described above.

In a preferred embodiment, composting trench 1702 is configured to hold from about 20 days to about 50 days of manure, and more preferably from about 25 days to about 30 days of manure. In other embodiments, composting trench 1702 is configured to hold less than about 20 days of manure or greater than about 50 days worth of manure. In a preferred embodiment, composting trench 1702 is configured such that the last few days of compost, preferably the last three days of compost, are covered. The cover captures gases that will be used for bioburden reduction and/or for killing the bacteria 16D as the composting process ceases.

Referring to FIG. 2, composting trench 1702 includes airflow ducts 1706 and a heat conducting water system 1712. Preferably, each of the airflow ducts 1706 and heat conducting water system 1712 is comprised of a plurality of pipes that are perpendicular to a longitudinal axis of composting trench 1702 (i.e., are perpendicular to flow of the compost). The pipes in the airflow ducts 1706 are preferably separate from the pipes in heat conducting water system 1712. Preferably, each of the pipes in the airflow ducts 1706 and each of the pipes in heat conducting water system 1712 is about 12 feet long and situated every few feet, i.e., about every 5 feet. Preferably, airflow ducts 1706 are used to regulate, provide, and/or supply airflow to various sections of composting trench 1702. Preferably, heat conducting water system 1712 is used to distribute the heat generated by the aerobic composting process to various sections of composting trench 1702. A plurality of manifolds and/or valves within these pipes may be used to distribute the gas/heat to the compost. Preferably, the pipes may be perforated to allow for transport of the process gases throughout composting trench 1702. For example, the pipes may transport gases such as air, oxygen and/or ammonia produced from the composting process of the present invention to various sections of composting trench 1702. In this manner, the gases may be distributed where needed. Additionally, composting trench 1702 may include vents. In other embodiments, airflow ducts 106 and/or heat conducting water system 1712 may be omitted and/or replaced with another suitable mechanism. In yet other embodiments, the pipes may be situated parallel to the longitudinal axis of composting trench 1702. In yet other embodiments, the pipes may not be perforated. In yet other embodiments, the pipes for airflow ducts 1706 and the pipes for heat conducting water system 1712 may not be separate. In yet other embodiments, heat may be controlled and/or distributed via electrical means and/or other non water-based means. In other embodiments, other means of distributing heat and/or controlling may be used, in lieu of, or in addition to, the means of distributing and/or controlling heat described above.

Referring to FIG. 18, composting trench 1702 of composting apparatus 1700 includes crawl space 1708 at top of composting trench 1702. Preferably, crawl space 1708 is used to enable access to the pipes for the purpose of reconfiguring the pipes and/or for maintenance of the pipes. In other embodiments, crawl space 1708 may be omitted or replaced by another suitable mechanism.

In a preferred embodiment, the temperature of the biomass does not exceed about 70 degree C. during the aerobic composting process according to present invention. Most preferably, the temperature of the biomass is kept between 50 degree C. and 70 degree C. In order to regulate the compost temperature, the heat generated by the aerobic composting process may be distributed as follows. For example, the aerobic composting process heats water in the pipes of heat conducting water system 1712. These pipes may distribute heat up and down composting trench 1702 by distributing hot water up and down composting trench 1702. For example, hot water may be sent to any part of composting trench 1702 via these pipes from a high temperature section of composting trench 1702.

In a preferred embodiment, a hood may be used to capture rising water vapor and/or $NH_3$ and/or $NH_4$ and $CO_2$ from the biomass as it generates heat. In yet other embodiments, in lieu of, or in addition to, using a hood to capture rising water vapor or $NH_3$ and/or $NH_4$ and $CO_2$ at least a portion of the roof of composting building 1704 may also be used. Preferably, the roof of the composting building 1704 includes steep eaves or a narrowed roof area to allow a more efficient capture and removal of $NH_3$ and/or $NH_4$ and $CO_2$ from inside composting building 1704.

The present invention generally operates as follows. Manure is collected from a CAFOs facility on a continuing basis, as soon as feasible. Preferably, manure is collected from a CAFOs facility within 12 hours of production. The collected manure has a moisture content of about 70-80% by weight. A source of carbon is added, preferably at a ratio of manure to carbon source of about 3:2, resulting in a biomass with a moisture content of preferably about 30%-70% by weight. Most preferably, the resulting biomass has a moisture content of about 50% by weight. Preferably, the source of carbon is sawdust. Other sources of carbon may be used in lieu of, or in conjunction with, sawdust. In addition to providing a carbon source during the aerobic composting process, the nature of the carbon source may also provide porosity to the biomass, improving the speed and efficiency of the capture of composting gases.

According to an embodiment of the invention, the floor of a CAFOs facility containing manure may be washed periodically, and the water and manure may be collected in a containment pool. The containment pool is preferably enclosed or shielded, such that the $NH_3$ and $CO_2$ gasses from the manure composting process cannot escape into the environment. The shielding or enclosure of the containment pool preferably contains a suitable air handling system manufactured to withstand the corrosion associated with $NH_3$ and $CO_2$ gases, which is used to collect the $NH_3$ and $CO_2$ gasses and to transfer the collected $NH_3$ and $CO_2$ gasses to one or more collection tank(s) 1801 which contain an aqueous solution. According to an embodiment of the invention, additional $CO_2$ gasses may be collected from the atmosphere of the CAFOs facility by means of a suitable air handling system manufactured to withstand the corrosion associated with $NH_3$ and $CO_2$ gases. The $CO_2$ gases collected from the atmosphere of the CAFOs facility are transferred via the air handling system to one or more collection tank(s) 1801.

In a preferred embodiment, the source of carbon includes carbon to nitrogen in the ratio of at least about 6:1. In other embodiments, the volume/amount of manure and/or carbon source used in the input may vary, depending on, for example, the capacity of composting trench 1702. In yet other embodiments, the carbon to nitrogen ratio of the source of carbon may be less than about 6:1 or greater than about 6:1. In yet other embodiments, an additional source of carbon may not be added to the manure, and the manure alone may be used in the composting process of the present invention.

Referring to FIG. 17, the input 1710 of the present invention is preferably manure mixed with a source of carbon to form a biomass having a high solids content for aerobic composting. The resulting biomass is spread around composting trench 1702, and is moved through composting trench 1702 as the composting process progresses. Preferably, the amount of biomass used in input 1710 is a day's worth of manure. This amount, of course, will vary depending upon, for example, the amount of available manure and/or sawdust and/or the size of composting apparatus 1700. A day's worth of biomass is loaded onto composting trench 1702 daily. As such, a new input may be created everyday and identified as "day 1 compost," "day 2 compost," "day 3 compost," etc. For example, the first day's biomass would be labeled as "day 1 compost." The next day, at about the same time, the previous day's biomass would be moved down the length of the composting trench 1702, making room for the second day's biomass. Second day's biomass is loaded onto composting trench 102 and labeled as "day 2 compost," and so forth. Preferably, the biomass is added at a specified time of day. To make room for the next day's biomass, the previous day's biomass is moved down composting trench 1702 using a rototiller (available from, for example Farmer Automatic of America). This leaves an open space for the next day's biomass in composting trench 1702. Preferably, each day's biomass is moved about 5 feet to about 10 feet down composting trench 1702.

Temperature, pH and moisture content of the biomass are controlled by aeration of the biomass both by a physical moving and mixing process, and by the addition of $O_2$ into composting trench 1702. Within the biomass, the dissolved ammonia gas $NH_3$ is in a chemical equilibrium with the $NH_4$. The ratio of $NH_4$ to $NH_3$ in this equilibrium is pH dependent. Preferably, the pH of the biomass is controlled to keep the alkalinity level of the biomass high so that most of the $NH_4$ in the biomass is converted to $NH_3$ and released into the air, and not nitrified by the bacteria 16D present in the biomass. Preferably, the pH of the biomass is also controlled so that the aerobic bacteria 16D are not killed by the $NH_3$ production. In a preferred embodiment, the pH of the biomass is between 8.0 and 10.1.

Each day's biomass may be moved once during the day, several times during the day, and/or continuously throughout the day. As the composting process commences, a rototiller may be used to mix/agitate and aerate the biomass. In other embodiments, other means of moving and/or aerating the biomass may be used in lieu, or in conjunction with, the rototiller. In yet other embodiments, biomass may not be added to the composting trench 1702 daily, but may be added more often than that, or less often than that, i.e., every other day. In this manner, the next load of biomass may be added the same day as the previous load, or every other day. The amount of biomass and time intervals between each addition may vary.

In a preferred embodiment, $O_2$ is added to the biomass during the aerobic composting process to facilitate the composting reaction. Preferably, the form of $O_2$ addition is air. Preferably, the rate of $O_2$ addition is determined by the temperature of the biomass 16A. Preferably, $O_2$ is added to any one or more of the day 1 to day 15 allotments of biomass. Preferably, the amount of $O_2$ added over the length of composting trench 1702 decreases. In this manner, preferably, the amount of $O_2$ added on day 10 is less than the amount of $O_2$ added on day 1. In other embodiments, other sources of $O_2$ may be used and/or other means of controlling $O_2$ addition may be used. Air ducts 1706 may be used to regulate airflow. This may ensure that bacteria 16D in the biomass receive an adequate supply of $O_2$ to complete the composting process. In other embodiments, other means of regulating airflow, in lieu of, or in conjunction with air ducts 1706, may be used.

Aerobic bacteria 16D are provided to highly selectively convert all or substantially all of the waste amino acids, proteins, uric acid and any other available nitrogen compounds in the biomass into $NH_3$ and/or $NH_4$ and $CO_2$. Preferably, the specific strains of aerobic bacteria 16D used in the present invention include uricolytic bacteria such as *Bacillus pasteurii* and/or *Peptostreptococcus anaerobius, Clostridium sticklandii, Clostridium aminophilum*, and *Eubacterium pyruvativorans*. Thermophilic bacteria are preferred because their presence reduces the population of harmful bacteria such as *E. coli, Salmonella* and fecal *coli*-form bacteria. During the aerobic composting process, the biomass should remain at a temperature of 50 C. to 70 C. to promote the growth of thermophilic bacteria. The heat to maintain this temperature is supplied by the aerobic composting process and is distributed by heat conducting water system 1712. Regular aeration of the biomass helps to regulate the temperature as well as supplies the oxygen to the bacteria 16D. It is not necessary to add external heat to the aerobic composting process to manufacture ammonium sulfate according to the present invention.

As the aerobic process progresses, the aerobic bacteria 16D highly selectively convert all or substantially all of the waste amino acids, proteins, uric acid and any other available nitrogen compounds in the biomass into $NH_3$ and/or $NH_4$ and $CO_2$. The resulting $NH_3$ and $CO_2$ gasses are collected from the atmosphere of the composting building 1700 by means of hood 1714 and/or air flow ducts 1706, or another suitable air handling system manufactured to withstand the corrosion associated with $NH_3$ and $CO_2$ gases. Preferably, the air handling system should be capable of changing the building volume of air in less than one hour.

Referring to FIG. 19, the air containing the collected $NH_3$ and $CO_2$ gasses is delivered to one or more collection tank(s) 1901 which contain an aqueous solution. The air containing the collected $NH_3$ and $CO_2$ gasses is forced by the air handling system to enter the collection tank(s) 1901 through an array of diffuser units 1902. Preferably, the diffuser units 1902 are adapted to release the collected $NH_3$ and $CO_2$ gases into the collection tank(s) 1901 as small gas bubbles, preferably 5 microns to 10,000 microns in diameter. Preferably, the number and size of the diffuser units 1902 is sufficient to ensure that substantially all of the collected $NH_3$ and $CO_2$ gasses are removed from the air as the air passes through the collection tank(s) 1901. After the passage through the collection tank(s) 1901, the air handling system may recycle the air back to the atmosphere of the composting building 1700 so that any unabsorbed $NH_3$ and $CO_2$ remaining in the air may be added back into composting trench 1702, and/or may be collected for future use or commercial purposes.

The captured $NH_3$ and/or $NH_4$ react with the aqueous solution in collection tank(s) 1901, and are converted to ammonium hydroxide. The ammonium hydroxide reacts with captured $CO_2$ to form ammonium polycarbonate. Preferably, the process is allowed continued until the pH in the collection tank(s) 1901 reaches 8.5 to 9.35. Preferably, the process is allowed to continue until the concentration of ammonium polycarbonate in the aqueous solution of the collection tank(s) 1901 reaches a concentration of between 1,600 ppm and 4,500 ppm as measured with an electrical conductivity meter.

In the preferred embodiment, after the concentration of ammonium polycarbonate in the aqueous solution of the collection tank(s) 1901 reaches a concentration of between 1,600 ppm and 4,500 ppm, the aqueous solution containing ammonium polycarbonate, ammonium hydroxide and $CO_2$, is removed from the collection tank(s) 1901 through a first piping system 1903, and is transferred to one or more pre-osmosis holding tank(s) 1904. In order to increase the concentration of the ammonium polycarbonate in the aqueous solution, the aqueous solution containing ammonium polycarbonate, ammonium hydroxide and $CO_2$ is transferred from pre-osmosis holding tank(s) 1904 to one or more reverse osmosis devices 206 through a second piping system 1905. The reverse osmosis devices may include a DOW™ FILMTEC™ XLE-440 reverse osmosis membrane, or a similar reverse osmosis membrane. The reverse osmosis process allows water to be removed from the aqueous solution resulting in a more concentrated ammonium polycarbonate solution. The removed water is transferred from reverse osmosis device(s) 1906 through a third piping system 1907 to a water holding tank 1908, and may be reused in the process or discarded. The reverse osmosis process may be repeated as necessary to increase the concentration of the ammonium polycarbonate in the aqueous solution. In other embodiments, the reverse osmosis process may be replaced by other processes suitable for increasing the concentration of the ammonium polycarbonate solution in the aqueous solution, or it may be omitted.

The aqueous solution containing concentrated ammonium polycarbonate is transferred from reverse osmosis device(s) 1906 through a fourth piping system 1909 to one or more reaction tank(s) 1910. Sulfate 1912 is added to reaction tank(s) 1910 at a ratio of approximately 5 pounds of sulfate for each 1 gallon of ammonia solution. In certain alternate preferred embodiments of the seventh method, the source of sulfate 1912 preferably comprises Organic Materials Review Institute ("OMRI") certified organic gypsum. According an embodiment of the present invention, in order to improve the yield of ammonium sulfate, excess sulfate 1912 may be added to reaction tank(s) 1910, at a ratio of approximately 6 pounds of sulfate for each 1 gallon of ammonia solution.

The temperature of the aqueous solution containing concentrated ammonium polycarbonate and sulfate 1912 in reaction tank(s) 1910 is raised to 50.degree. C. or allowed to rise to 50.degree. C. due to the chemical reaction between the ammonium carbonate and sulfate 1912. During the initial reaction period (preferably four hours), the aqueous solution containing concentrated ammonium polycarbonate and sulfate 1912 is mixed and circulated inside reaction tank(s) 1910, resulting in the formation of ammonium sulfate suspension 1915 and calcium carbonate. The pressure may be allowed to increase in the reaction tank(s) 1910 in order to increase the rate and yield of ammonium sulfate. Preferably, the pressure is allowed to increase to two atmospheric pressures or greater. Calcium carbonate is allowed to settle to the bottom of reaction tank(s) 1910 in the form of the calcium carbonate sludge. In a preferred embodiment, the calcium carbonate sludge is removed from reaction tank(s) 1910 through a floor drain and a fifth piping system 1916 to one or more bag filters 1917 which capture the calcium carbonate sludge. The resulting captured calcium carbonate sludge can be recovered and used as a separate product for various agricultural and non-agricultural purposes.

After the initial reaction period (preferably four hours), the aqueous solution containing concentrated ammonium polycarbonate, sulfate 1912 and ammonium sulfate suspension 1915 is moved from reaction tank(s) 1910 through a sixth piping system 1913 to one or more holding area tank(s) 1914, where the presence of unreacted sulfate 1912 in said aqueous solution allows the formation of ammonium sulfate suspension 1915 to proceed for an additional period of time, preferably for more than 5 days. Most preferably, the formation of additional ammonium sulfate suspension 1915 in holding area tank(s) 1914 is allowed to proceed for a period of 10 days.

According to an embodiment of the invention, the resulting ammonium sulfate suspension 1915 may be centrifuged to remove excess water in order to concentrate the ammonium sulfate suspension 1915 to a desired density for use as a liquid fertilizer. In other embodiments, the centrifugation process may be replaced by other processes suitable for increasing the concentration of the ammonium sulfate suspension 1915. According to an embodiment of the invention, the ammonium sulfate suspension 1915 may be dried to form crystals of dry ammonium sulfate. The resulting liquid or dry ammonium sulfate is certifiable as organic. The term "organic" as used herein, is a labeling certification term that refers to an agriculture product produced in accordance with the Code of Federal Regulations ("CFR") Title 7 (Subtitle B, Chapter I, Subchapter M, Part 205).

The foregoing disclosures and statements are illustrative only of the Present Invention, and are not intended to limit or define the scope of the Present Invention. The above description is intended to be illustrative, and not restrictive. Although the examples given include many specificities, they are intended as illustrative of only certain possible configurations or aspects of the Present Invention. The examples given should only be interpreted as illustrations of some of the preferred configurations or aspects of the Present Invention, and the full scope of the Present Invention should be determined by the appended claims and their legal equivalents. Those skilled in the art will appreciate that various adaptations and modifications of the just-described preferred embodiments can be configured without departing from the scope and spirit of the Present Invention. Therefore, it is to be understood that the Present Invention may be practiced other than as specifically described herein. The scope of the present invention as disclosed and claimed should, therefore, be determined with reference to the knowledge of one skilled in the art and in light of the disclosures presented above.

We claim:

1. A method comprising:
   a. forming a volume of fluid water;
   b. burning sulfur in the presence of oxygen to form sulfur dioxide;
   c. exposing the volume of fluid water to the sulfur dioxide, whereby the volume of fluid water is transformed into an aqueous solution having a pH below 5;
   d. exposing the aqueous solution to an atmospheric gas volume comprising a volume of gaseous ammonia, wherein the volume of gaseous ammonia is at least partially generated from bacteria comprised within a biomass of mammalian dung or avian feces; and
   e. removing a component of the aqueous solution from the aqueous solution, the component comprising nitrogen compounds.

2. The method of claim 1, wherein the component comprises ammonium sulfate.

3. The method of claim 1, wherein the component is removed from the aqueous solution in a solution comprising a portion of the aqueous solution.

4. The method of claim 1, further comprising:
   f. continuing to expose the aqueous solution to the sulfur dioxide until a pH measurement of the aqueous solution of approximately four is generated; and
   g. halting the exposure of the sulfur dioxide until a pH measurement of the aqueous solution of approximately five is generated; and
   h. resuming exposure of the aqueous solution to the sulfur dioxide until a pH measurement of the aqueous solution of approximately four is again generated.

5. The method of claim 1, further comprising enclosing a source volume of atmosphere at approximately standard atmospheric pressure, the source volume of atmosphere additionally comprising gaseous ammonia from which the gaseous ammonia introduced into the aqueous solution is sourced.

6. The method of claim 1, wherein the volume of gaseous ammonia includes molecules of NH3 and molecules of NH4+.

7. The method of claim 1, wherein the volume gaseous ammonia is at least partially generated from mammalian dung or avian feces.

8. The method of claim 1, wherein the gaseous sulfur dioxide is pressure injected into the volume of fluid water to form the aqueous solution.

9. A method comprising:
   a. collecting an organic waste mass containing ammonium, the waste mass comprising bacteria, wherein the bacteria generate a volume of gaseous ammonia;
   b. forming a volume of fluid water;
   c. burning sulfur in the presence of oxygen to form sulfur dioxide;
   d. exposing the volume of fluid water to the sulfur dioxide, whereby the volume of fluid water is transformed into an aqueous solution having a pH below 5;
   e. exposing the aqueous solution to the gaseous ammonia; and
   f. removing a resultant component comprising a nitrogen compound from the aqueous solution.

10. The method of claim 9, wherein the resultant component comprises ammonium sulfate.

11. The method of claim 9, wherein the resultant component is at least partially removed from the aqueous solution in combination with a portion of the aqueous solution.

12. The method of claim 9, further comprising aerating the waste mass by mechanical disturbance, whereby a rate of generation of gaseous ammonia by the bacteria is increased.

13. The method of claim 12, wherein the aeration of the organic waste comprises mechanical disturbance.

14. The method of claim 9, further comprising enclosing the waste mass, whereby the gaseous ammonia is collected prior to introduction of the gaseous ammonia into the fluid water.

15. The method of claim 11, further comprising substantively removing the component from the volume fluid water while simultaneously introducing additional gaseous ammonia and additional gaseous sulfur dioxide into the volume of fluid water.

16. A system comprising:
   a. a volume of fluid water;
   b. a sulfur burner module, the sulfur burner module adapted to form sulfur dioxide by a sustained ignition of sulfur;
   c. means to inject the sulfur dioxide into the volume of fluid water, whereby the sulfur dioxide and the volume of fluid water form an acidic aqueous solution;
   d. means to expose a gaseous volume comprising a volume of gaseous ammonia to the acidic aqueous solution, whereby the acidic aqueous solution absorbs ammonia, and wherein the volume of gaseous ammonia is at least partially generated from bacteria comprised within a biomass of mammalian dung or avian feces; and
   e. means to remove a resultant component from the aqueous solution.

17. The system of claim 16, further comprising an enclosure, the enclosure adapted to substantively contain the gaseous volume.

18. The system of claim 16, wherein the means to remove the resultant component from the aqueous solution comprises a reverse osmosis apparatus.

19. The system of claim 16, wherein the means to remove the resultant component from the aqueous solution comprises an electro-dialysis apparatus.

20. The system of claim 16, wherein resultant component comprises ammonium sulfate.

* * * * *